(12) United States Patent
Yui et al.

(10) Patent No.: US 11,110,677 B2
(45) Date of Patent: Sep. 7, 2021

(54) APPARATUS AND METHOD FOR MANUFACTURING RUBBER SHEET CONTAINING STEEL CORD

(71) Applicant: TOKUSEN KOGYO CO., LTD., Ono (JP)

(72) Inventors: Kiyoshi Yui, Ono (JP); Takuto Fujisawa, Ono (JP)

(73) Assignee: TOKUSEN KOGYO CO., LTD., Ono (JP)

( * ) Notice: Subject to any disclaimer, the term of this patent is extended or adjusted under 35 U.S.C. 154(b) by 309 days.

(21) Appl. No.: 16/302,138

(22) PCT Filed: Mar. 10, 2017

(86) PCT No.: PCT/JP2017/009694
§ 371 (c)(1),
(2) Date: Nov. 16, 2018

(87) PCT Pub. No.: WO2017/199553
PCT Pub. Date: Nov. 23, 2017

(65) Prior Publication Data
US 2019/0315082 A1     Oct. 17, 2019

(30) Foreign Application Priority Data
May 17, 2016   (JP) .............................. JP2016-098516

(51) Int. Cl.
*B29D 30/38*   (2006.01)
*B60C 9/00*   (2006.01)
(Continued)

(52) U.S. Cl.
CPC ........ *B29D 30/38* (2013.01); *B29C 66/72141* (2013.01); *B29C 70/16* (2013.01);
(Continued)

(58) Field of Classification Search
CPC ..................... Y10S 156/906; Y10S 156/907
See application file for complete search history.

(56) References Cited

U.S. PATENT DOCUMENTS

| | | |
|---|---|---|
| 4,401,493 A | 8/1983 | Bailey et al. |
| 4,409,059 A | 10/1983 | Holroyd et al. |

FOREIGN PATENT DOCUMENTS

| | | |
|---|---|---|
| JP | 57-96843 A | 6/1982 |
| JP | 2007-217820 A | 8/2007 |
| JP | 2016-144932 A | 8/2016 |

OTHER PUBLICATIONS

International Search Report of PCT/JP2017/009694 dated May 9, 2017.

*Primary Examiner* — Barbara J Musser
(74) *Attorney, Agent, or Firm* — Sughrue Mion, PLLC

(57) ABSTRACT

A manufacturing apparatus of a rubber sheet containing a steel cord, including a feeding device which feeds the steel cord while keeping a specified tension; a forming device which winds the steel cord being fed by the feeding device around engagement parts spaced from each other with a predetermined width; and a placement device which places on a rubber sheet member, the steel cord wound around the engagement parts with the predetermined width. The forming device includes forming parts which press bent portions of the steel cord wound around the engagement parts to form a bending shape of the bent portions, and the placement device includes a plurality of retaining parts disposed in two rows spaced apart from each other with the predetermined width to retain the bent portions in a state in which the steel cord having the bending shape is placed on the rubber sheet member.

6 Claims, 16 Drawing Sheets

(51) Int. Cl.
    *B60C 9/20* (2006.01)
    *B29C 70/16* (2006.01)
    *B29C 70/68* (2006.01)
    *B29C 65/00* (2006.01)
    *B60C 9/26* (2006.01)

(52) U.S. Cl.
    CPC .......... *B29C 70/687* (2013.01); *B60C 9/0007* (2013.01); *B60C 9/20* (2013.01); *B60C 9/263* (2013.01); *B60C 2009/2032* (2013.01); *Y10S 156/907* (2013.01)

APPARATUS AND METHOD FOR MANUFACTURING RUBBER SHEET CONTAINING STEEL CORD

CROSS REFERENCE TO RELATED APPLICATIONS

This application is a National Stage of International Application No. PCT/JP2017/009694 filed Mar. 10, 2017, claiming priority based on Japanese Patent Application No. 2016-098516 filed May 17, 2016.

TECHNICAL FIELD

The present invention relates to an apparatus and method for manufacturing a rubber sheet (manufacturing apparatus and manufacturing method of a rubber sheet) containing a steel cord, such as a reinforcement rubber sheet for an automobile tire.

BACKGROUND ART

Conventionally, for example, in a radial tire mounted in an automobile, a reinforcement rubber sheet ("belt (breaker)") containing steel cords (in the description and claims, the term "steel cord" refers to a steel cord formed by stranding (twisting) wires together, a steel cord formed by stranding (twisting) strands each including stranded (twisted) wires together, and a steel cord formed by stranding (twisting) the wires and the strands together) is disposed between a carcass and a tread.

As the above-described reinforcement rubber sheet, typically, several hundreds of steel cords which are elongated (several hundreds of meters to several tens of thousands of meters) are arranged in parallel on a rubber sheet, and a calender sheet containing the steel cords interposed between two rubber sheets is manufactured. Then, the calender sheet is cut obliquely based on a width and bias angle with which the calender sheet is to be bonded to a tire, and a reinforcement rubber sheet with a rectangular shape is formed. This reinforcement rubber sheet is formed into a circular shape and contained into the tire. Therefore, this reinforcement rubber sheet is suitable for mass production of a standard product.

However, since the calender sheet is cut obliquely when the reinforcement rubber sheet is manufactured in the above-described method, cut end portions of a plurality of wires are exposed at widthwise both end portions. As the wires, steel wires having been brass-plated so that the steel wires are chemically bonded to the rubber sheet member are used. For this reason, in the end portions of the wires which are cut in the above-described manner, portions which are not brass-placed contact the rubber sheet member, and are not bonded to the rubber sheet member.

In recent years, with improvement of the performance of automobiles, qualities required for automobile tires have become diverse. In addition, the kinds of the automobile tires have been increasing. Under the circumstances, there are demands for manufacturing of tires with more kinds and less quantities. However, with the above-described method for mass production, it is difficult to fulfill such demands.

As a prior art, there has been proposed a manufacturing method of a reinforcement rubber sheet for an automobile tire, in which production lots of the tire can be reduced and unproductive spaces and transportation can be eliminated without cutting steel cords (see Patent Literature 1).

CITATION LIST

Patent Literature

Patent Literature 1: Japanese Laid-Open Patent Application Publication No. 2007-217820

SUMMARY OF INVENTION

Technical Problem

However, in the above-described Patent Literature 1, it is difficult to continuously bend the steel cord and stably place the steel cord on the rubber sheet member, after the steel cord is manufactured. Therefore, there is a need for an apparatus and method for manufacturing a rubber sheet, which can properly bend the steel cord and stably place the steel cord on the rubber sheet member.

Solution to Problem

An object of the present invention is provide an apparatus and method for manufacturing a rubber sheet (manufacturing apparatus and manufacturing method of a rubber sheet) containing a steel cord, which can properly bend the steel cord and stably place the steel cord on a rubber sheet member.

To achieve the above-described object, a manufacturing apparatus of a rubber sheet containing a steel cord, of the present invention, comprises a feeding device which feeds the steel cord while keeping a specified tension; a forming device which winds the steel cord being fed by the feeding device around engagement parts and engages the steel cord with the engagement parts, the engagement parts being disposed to be spaced from each other with a predetermined width; and a placement device which places on a rubber sheet member, the steel cord wound around the engagement parts with the predetermined width by the forming device, wherein the forming device includes forming parts which press bent portions of the steel cord wound around the engagement parts to form a bending shape of the bent portions, and wherein the placement device includes a plurality of retaining parts disposed in two rows to be spaced apart from each other with the predetermined width to retain the bent portions in a state in which the steel cord having the bending shape formed by the forming device is placed on the rubber sheet member.

In accordance with this configuration, since the steel cord being fed by the feeding device while keeping the specified tension is wound around the engagement parts of the forming device, the steel cord is wound around the engagement parts while keeping the specified tension. The bent portions of the steel cord wound around the engagement parts are pressed by the forming parts to form the bending shape of the bent portions, in a state in which the steel cord is wound around the engagement parts. The steel cord including the bent portions having the bending shape is placed on the rubber sheet member and retained by the retaining parts. In this way, the steel cord is properly bent with the predetermined width and the bending shape of the bent portions is formed while keeping the specified tension. In this state, the steel cord is placed on the rubber sheet member. As a result, it becomes possible to manufacture the rubber sheet in which the steel cord having been properly bent with the predetermined width which is a suitable length is stably placed at a proper position of the rubber sheet member.

The engagement parts may include engagement pins, respectively which engage the steel cord, the retaining parts may include retaining pins protruding upwardly from the rubber sheet member toward the engagement parts, the engagement pins and the retaining pins may be configured to become close to each other and away from each other, and in a state in which the engagement pins and the retaining pins are close to each other, the bent portions may be transferred from the engagement pins to the retaining pins and retained by the retaining pins. The state in which the engagement pins and the retaining pins are close to each other (each of the engagement pins and the corresponding one of the retaining pins are close to each other) includes a state in which the engagement pins and the retaining pins are close to each other with a clearance (each of the engagement pins and the corresponding one of the retaining pins are close to each other with a clearance), and a state in which the engagement pins and the retaining pins are in contact with each other (each of the engagement pins and the corresponding one of the retaining pins are in contact with each other).

In accordance with this configuration, the bent portions wound around the engagement pins are transferred from the engagement pins to the retaining pins. Therefore, while keeping the state of the steel cord bent with the predetermined width, the steel cord can be properly placed and retained on the rubber sheet.

After the bending shape of the bent portions of the steel cord is formed, the bent portions may be transferred from the engagement pins to the retaining pins in turn, and the steel cord may be retained on the rubber sheet member.

In accordance with this configuration, after the steel cord is bent with the predetermined width and the bending shape of bent portions is formed, the steel cord can be retained on a proper position in turn on the rubber sheet member.

The retaining pins may penetrate the rubber sheet member and protrude toward the engagement parts, and the placement device may be configured to remove the retaining pins when the steel cord placed on the rubber sheet member is sandwiched between the rubber sheet member and another rubber sheet member to form the rubber sheet.

In accordance with this configuration, since the retaining pins penetrate the rubber sheet member, the steel cord retained by the retaining pins is retained at a proper position of the rubber sheet member. Since the steel cord retained on the rubber sheet member is sandwiched between this rubber sheet member and another rubber sheet member and the rubber sheet is formed, the steel cord can be precisely contained in the rubber sheet.

The manufacturing apparatus of the rubber sheet containing the steel cord, may further comprise: a stranding (twisting) device which is disposed upstream of the feeding device and strands (twists) a plurality of wires, a plurality of strand cords, or a wire and a strand cord in opposite directions at an interval of the predetermined width, to form the steel cord, wherein the feeding device may include a feeding unit which feeds the steel cord to the forming device so that unstranded (untwisted) portions between portions having been stranded (twisted) in the opposite directions by the stranding device are wound around the engagement parts.

In accordance with this configuration, of the steel cord formed by stranding (twisting) the plurality of wires, the plurality of strand cords, or the wire and the strand cord, the unstranded (untwisted) portions between the portions having been stranded in the opposite directions are engaged with the engagement parts and bent, and the bending shape of the bent portions is formed. This makes it possible to stabilize the bending shape of the bent portions. Therefore, the steel cord with the tension kept is stably bent by the engagement parts, and the steel cord bent by the engagement parts can be placed on the rubber sheet member in a state in strand (twist) directions are opposite to each other.

A manufacturing method of a rubber sheet containing a steel cord, of the present invention, comprises feeding the steel cord at a predetermined interval while keeping a specified tension; winding the steel cord around engagement parts and engaging the steel cord with the engagement parts, in turn, the engagement parts being disposed to be spaced apart from each other with a predetermined width; forming a bending shape of bent portions of the steel cord wound around the engagement parts, and placing the steel cord including the bent portions having the bending shape formed at the engagement parts, on a rubber sheet member, and retaining the steel cord on the rubber sheet member.

In accordance with this method, since the steel cord is fed, wound around and engaged with the engagement parts while keeping the specified tension, the steel cord is wound around the engagement parts while keeping the specified tension. The bent portions of the steel cord wound around the engagement parts are pressed and the bending shape of the bent portions is formed by the forming parts in a state in which the steel cord is wound around the engagement parts. The steel cord having the bending shape at the positions of the engagement parts is placed and retained on the rubber sheet member. In this way, the steel cord which has been properly bent with the predetermined width while keeping the specified tension can be stably placed on the rubber sheet member.

Advantages of Invention

In accordance with the present invention, it becomes possible to stably manufacture a rubber sheet in which a steel cord is properly bent with a predetermined width and the bending shape of the steel cord is formed while keeping a specified tension, and this steel cord is properly placed on a rubber sheet member.

BRIEF DESCRIPTION OF DRAWINGS

FIG. 3A is a front view, and FIG. 3B is a partial plan view.

FIG. 4A is a front view, and FIG. 4B is a partial plan view.

FIG. 5A is a front view, and FIG. 5B is a partial plan view.

FIG. 6A is a front view, and FIG. 6B is a partial plan view.

FIG. 7A is a front view, and FIG. 7B is a partial plan view.

FIG. 8A is a front view, and FIG. 8B is a partial plan view.

FIG. 9A is a front view, and FIG. 9B is a partial plan view.

FIG. 10A is a front view, and FIG. 10B is a partial plan view.

FIG. 11A is a front view, and FIG. 11B is a partial plan view.

FIG. 12A is a front view, and FIG. 12B is a partial plan view.

FIG. 13A is a front view, and FIG. 13B is a partial plan view.

FIG. 14A is a front view, and FIG. 14B is a partial plan view.

FIG. 15A is a front view, and FIG. 15B is a partial plan view.

DESCRIPTION OF EMBODIMENTS

Figure 1:
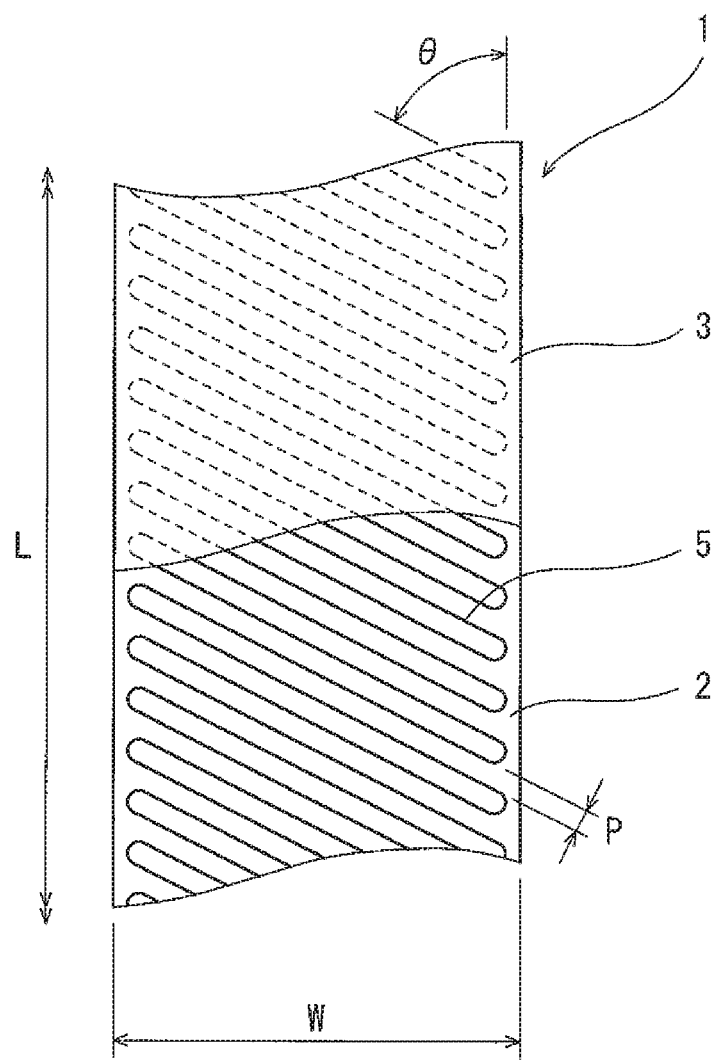
FIG. 1 is a plan view showing a rubber sheet manufactured by a manufacturing apparatus of a rubber sheet containing a steel cord, according to the present invention.

Hereinafter, the embodiment of the present invention will be described with reference to the drawings. Hereinafter, an upstream side in the feeding direction of a rubber sheet member 2 will be referred to as a near side and a downstream side in the feeding direction of the rubber sheet member 2 will be referred to as a far side. In the drawings, a steel cord, engagement pins, retaining pins and the like are illustrated as enlarged. In the description and claims, the directions of upward (upper), downward (lower), rightward (right) and leftward (left) correspond to the directions from the perspective of a person who sees a manufacturing apparatus 10 in a state of FIG. 3A. In the present embodiment, of the same components (constituents) disposed on a left side and a right side, the component disposed on the left side will be expressed by use of "L", and the component disposed on the right side will be expressed by use of "R". Also, only the reference numeral is used to indicate both of the components disposed on the left side and the right side.

(Configuration of Rubber Sheet Containing Steel Cord)

FIG. 1 is a plan view showing a portion of a rubber sheet 1 manufactured by the manufacturing apparatus 10 according to the present invention. The rubber sheet 1 contains a steel cord 5 between two rubber sheet members 2, 3 (the steel cord 5 is embedded between the two rubber sheet members 2, 3). The rubber sheet 1 is formed in such a way that the steel cord 5 which is bent is placed on one of the surfaces of the rubber sheet member 2 which is one (lower rubber sheet member) of the rubber sheet members 2, 3, sandwiched between the lower rubber sheet member 2 and the rubber sheet member 3 which is the other (upper rubber sheet member) of the rubber sheet members 2, 3, and bonded thereto. The steel cord 5 is contained in the rubber sheet 1 with a predetermined embedding angle θ and a predetermined embedding pitch P. The steel cord 5 contained in the rubber sheet 1 is bent at widthwise both end positions of the rubber sheet 1 and is not exposed at the widthwise end portions of the rubber sheet 1.

As an example of the rubber sheet 1, the rubber sheet 1 containing the steel cord 5 of an automobile tire has a width W which is about 100 mm to 400 mm, and a length L which is about 1000 mm to 3000 mm, is manufactured. Note that the size of the rubber sheet 1 may be suitably chosen depending on the use.

(Example of Steel Cord)

Figure 2:
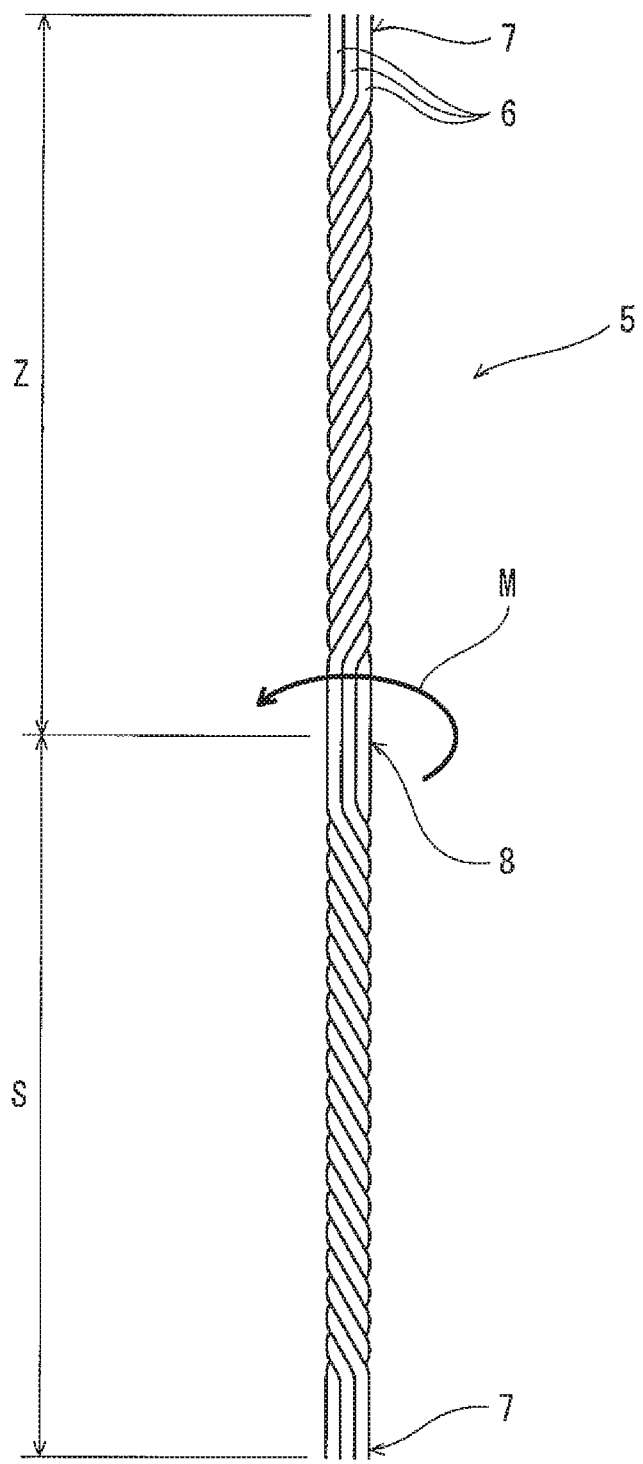
FIG. 2 is a plan view showing an example of the steel cord of FIG. 1.

FIG. 2 is a plan view showing an example of the steel cord 5 of FIG. 1. In this example of the steel cord 5, a plurality of wires 6 are stranded (twisted) by use of a stranding (twisting) device (not shown: for example, chucking portions 7 set at predetermined intervals (S, Z), of a plurality of wires 6, are chucked, and an intermediate portion 8 of the wires 6 is rotated in one direction M. In this way, the portions of the wires 6 which are on both sides of the intermediate portion 8 are stranded (twisted) in opposite directions). In this example of the steel cord 5, as will be described later, the steel cord 5 is stranded (twisted) at the predetermined intervals (S, Z) which are equal to a predetermined width V (FIG. 3) with which the steel cord 5 is bent by a forming device 30. In the stranded (twisted) steel cord 5, a portion indicated by Z is Z-stranded portion, and a portion indicated by S is S-stranded portion. Strand (twist) directions are merely exemplary. As an example of the wires 6, steel wires which are about 0.1 mm to 0.6 mm and are brass-plated may be used.

As examples of the steel cord 5, there are a steel cord formed by stranding (twisting) the wires 6 together, a steel cord formed by stranding strand cords each including stranded (twisted) wires, together, and a steel cord formed by stranding (twisting) the wire and the strand cord together.

(Configuration of Rubber Sheet Manufacturing Apparatus)

Figure 3A:
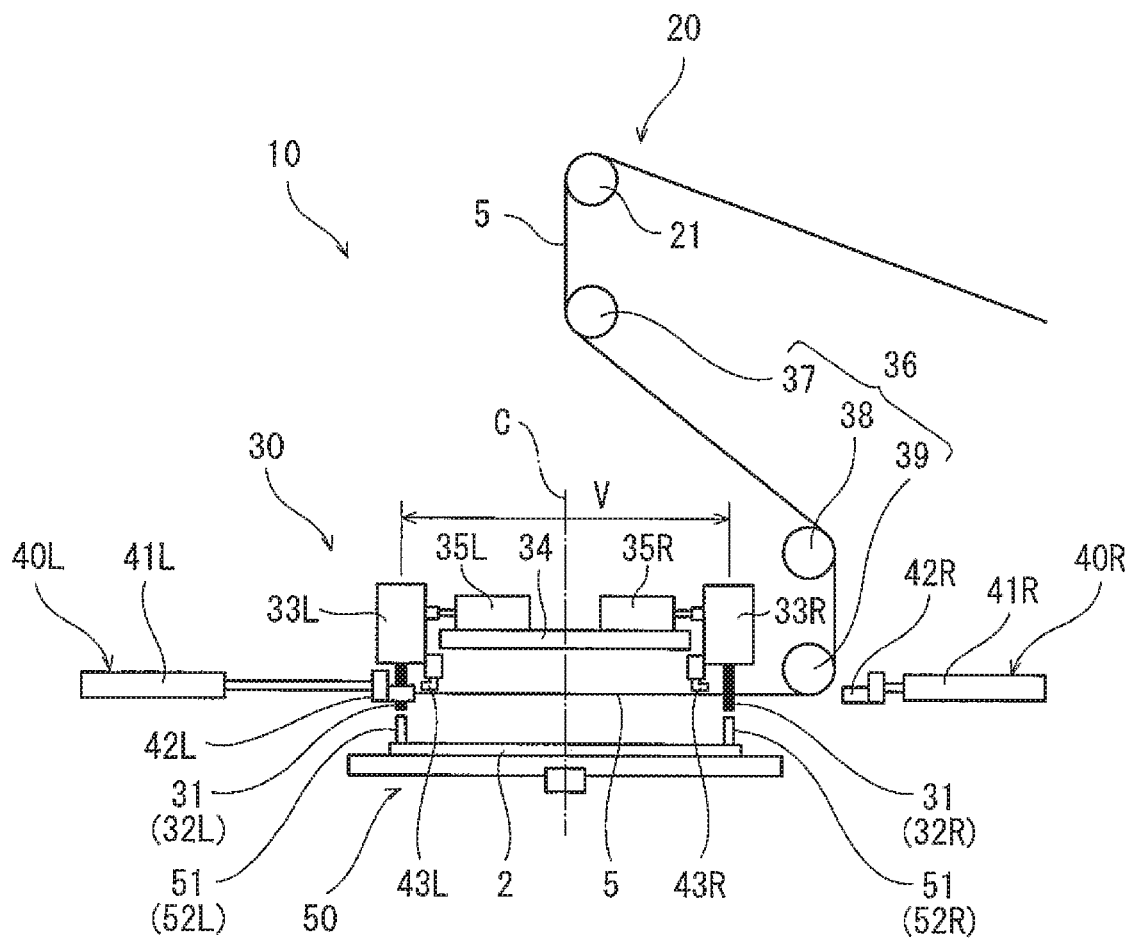
FIGS. 3A and 3B are views showing an embodiment of the manufacturing apparatus of the rubber sheet containing the steel cord, according to the present invention.
Figure 3B:
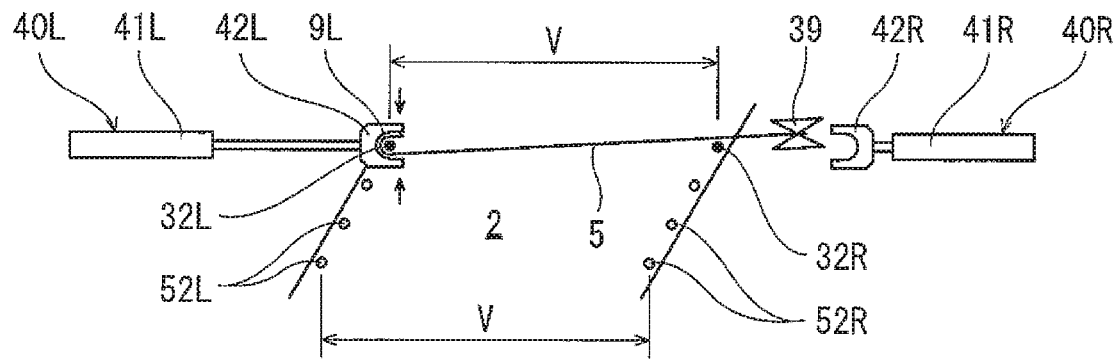

FIGS. 3A and 3B are views showing an embodiment of the manufacturing apparatus 10 of the rubber sheet 1 containing the steel cord 5, according to the present invention. FIG. 3A is a front view, and FIG. 3B is a partial plan view. As shown in FIG. 3A, the manufacturing apparatus 10 includes a feeding device 20 as a feeding unit which feeds the steel cord 5 while keeping a specified tension, the forming device 30 which winds the steel cord 5 being fed by the feeding device 20 around engagement parts 31 and engages the steel cord 5 with the engagement parts 31, in turn, the engagement parts 31 being placed to be spaced apart from each other with the predetermined width V, and a placement device 50 which places the steel cord 5 wound around the engagement parts 31 of the forming device 30 on retaining parts 51 on the rubber sheet member 2 and thereby retains the steel cord 5 by the retaining parts 51. In the manufacturing apparatus 10 of the present embodiment, the engagement parts 31 of the forming device 30 include engagement pins 32L, 32R, and the retaining parts 51 of the placement device 50 include retaining pins 52L, 52R protruding toward the engagement pins 32L, 32R, respectively. As examples of the engagement pins 32L, 32R and the retaining pins 52L, 52R, for example, pins which are about 1 mm may be used. In the following drawings, the engagement pins 32L, 32R are shown by black color, while the retaining pins 52L, 52R are shown by while color.

The feeding device 20 is configured to feed the steel cord 5 from above toward the forming device 30. The feeding device 20 includes a first roller 21 which feeds the steel cord 5 in a downward direction on a center line C between the engagement pins 32L, 32R disposed to be spaced apart from each other with the predetermined width W in the forming device 30. The first roller 21 is disposed at a fixed position. The feeding device 20 is configured to feed the steel cord 5 while keeping a specified tension.

The feeding device 20 is configured to feed the steel cord 5 stranded (twisted) as shown in FIG. 2 to the forming device 30 at a predetermined pitch so that the intermediate portion 8 and the chucking portions 7 which are not stranded (twisted) in the opposite directions are wound around the engagement pins 32L, 32R as will be described later. In this way, the chucking portions 7 and the intermediate portion 8 (portions) which are not stranded (twisted) in the opposite directions are engaged with the engagement pins 32L, 32R and bent, and the bending shape of the bent portions 9 is formed. This makes it possible to stabilize the shape of the bent portions. The steel cord 5 with the tension kept, which is bent at the engagement pins 32L, 32R, can be placed on the rubber sheet member 2 as will be described later, in a state in which the strand (twist) directions are opposite to each other.

In the forming device 30, the engagement pins 32L, 32R are disposed so that the steel cord 5 is wound around the engagement pins 32L, 32R with the predetermined width V. The predetermined width V between the left engagement pin 32L and the right engagement pin 32R is set according to the width of the rubber sheet member 2. The predetermined width V is set to a dimension with which the steel cord 5 wound around the engagement pins 32L, 32R does not protrude outward in the width direction from the widthwise end portions of the rubber sheet member 2 in a state in which the steel cord 5 is placed on the rubber sheet member 2. The engagement pins 32L, 32R are provided at jack parts 33L, 33R, respectively. As will be described later, the jack parts 33L, 33R allow the engagement pins 32L, 32R to be independently advanced toward the retaining pins 52L, 52R, respectively, and to be independently retractable from the retaining pins 52L, 52R, respectively. A left horizontal movement cylinder 35L provided at a frame 34 of the forming device 30 allows the left jack part 33L to be horizontally movable. A right horizontal movement cylinder 35R provided at the frame 34 of the forming device 30 allows the right jack part 33R to be horizontally movable.

The forming device 30 further includes a roller unit 36 which feeds the steel cord 5 being fed in the downward direction by the first roller 21 of the feeding device 20, to a predetermined position of the forming device 30. The roller unit 36 includes a second roller 37 which feeds the steel cord 5 being fed by the first roller 21 in an oblique direction to a location that is lateral of the forming device 30, a third roller 38 which feeds the steel cord 5 in the downward direction at a location that is lateral of the engagement pins 32L, 32R, and a fourth roller 39 which feeds the steel cord 5 in a horizontal direction at a height of the engagement pins 32L, 32R. The placement of the roller unit 36 can be changed, by rotating the second roller 37, the third roller 38, and the fourth roller 39 together around the center line C in a clockwise or counterclockwise direction to the right or the left (FIG. 4).

The forming device 30 further includes forming parts 40L, 40R which press the bent portions 9L, 9R of the steel cord 5 wound around the left and right engagement pins 32L, 32R, respectively, and form the bending shape of the bent portions 9L, 9R. The forming parts 40L, 40R include forming cylinders 41L, 41R, respectively, which horizontally advance chucks 42L, 42R toward the engagement pins 32L, 32R, respectively, and horizontally retract the chucks 42L, 42R from the engagement pins 32L, 32R, respectively. The chucks 42L, 42R are configured to press the steel cord 5 wound around the engagement pins 32L, 32R to form the bending shape of the steel cord 5. The chucks 42L, 42R with U-shaped groove shape may be used.

The forming device 30 further includes pushing parts 43L, 43R which transfer the steel cord 5 having been wound around the engagement pins 32L, 32R and having the bending shape, toward the retaining pins 52L, 52R of the placement device 50. It is sufficient that the pushing parts 43L, 43R are members which push the bent portions 9 of the steel cord 5 wound around the engagement pins 32L, 32R, toward the retaining pins 52L, 52R, respectively.

As shown in FIG. 3B, the placement device 50 feeds the rubber sheet member 2 in an oblique direction with respect to the engagement pins 32L, 32R, of the forming device 30. As shown in FIG. 1, the steel cord 5 placed on the rubber sheet member 2 is placed at the predetermined angle with respect to the lengthwise direction of the rubber sheet 1. Therefore, the placement device 50 feeds the rubber sheet member 2 in the oblique direction with respect to the steel cord 5 bent by the forming device 30.

In the placement device 50, the plurality of retaining pins 52L, 52R are arranged in two rows and spaced from each other with the predetermined width V, to retain the bent portions 9 of the steel cord 5 having been wound around the engagement pins 32L, 32R of the forming device 30 and having the bending shape, in a state in which the steel cord 5 is placed on the rubber sheet member 2. In the present embodiment, as will be described later, the bent portions 9 of the steel cord 5 are transferred straightly from the engagement pins 32L, 32R toward the retaining pins 52L, 52R. Therefore, the engagement pins 32L, 32R are arranged in two rows and spaced from each other with the predetermined width V, and the retaining pins 52L, 52R are arranged in two rows with the predetermined width V. In the present embodiment, the retaining pins 52L, 52R of the placement device 50 upwardly penetrate the rubber sheet member 2 from below and protrude toward the engagement pins 32L, 32R.

Each of the engagement pins 32L, 32R and the retaining pins 52L, 52R may have a tapered shape with a diameter reduced toward the tip end. With this shape, the steel cord 5 can be transferred more smoothly. Alternatively, the lower ends of the engagement pins 32L, 32R may be inclined inwardly. In this case, the upper ends of the retaining pins 52L, 52R may be disposed to be spaced from each other with the predetermined width equal to that of the lower ends of the engagement pins 32L, 32R. It is sufficient that the engagement pins 32L, 32R are disposed to be spaced apart from each other with a predetermined width and the retaining pins 52L, 52R are disposed to be spaced from each other with a predetermined width so that the bent portions 9L, 9R are transferred from the engagement pins 32L, 32R to the retaining pins 52L, 52R.

As described above, in the present embodiment, the engagement pins 32L, 32R are configured to become close to or away from the retaining pins 52L, 52R, respectively. In a state in which the engagement pins 32L, 32R and the retaining pins 52L, 52R are close to each other (each of the engagement pins 32L, 32R and corresponding one of the retaining pins 52L, 52R are close to each other), the bent portions 9 of the steel cord 5 are pushed by the pushing parts 43L, 43L, transferred from the engagement pins 32L, 32R toward the retaining pins 52L, 52R, and retained by the retaining pins 52L, 52R, respectively. The state in which the engagement pins 32L, 32R and the retaining pins 52L, 52R are close to each other (each of the engagement pins 32L, 32R and corresponding one of the retaining pins 52L, 52R are close to each other) includes a state in which the engagement pins 32L, 32R and the retaining pins 52L, 52R are close to each other, with a small clearance, (each of the engagement pins 32L, 32R and corresponding one of the retaining pins 52L, 52R are close to each other, with a clearance,) and a state in which the engagement pins 32L, 32R and the retaining pins 52L, 52R are in contact with each other (each of the engagement pins 32L, 32R and corresponding one of the retaining pins 52L, 52R are in contact with each other). Alternatively, the retaining pins 52L, 52R may be configured to become close to or away from the engagement pins 32L, 32R, respectively.

In accordance with the manufacturing apparatus 10 of the rubber sheet 1, the steel cord 5 being fed by the feeding device 20 while keeping a specified tension is wound around the engagement pins 32L, 32R of the forming device 30. The forming parts 40L, 40R form the bending shape of the bent portions 9 of the steel cord 5 wound around the engagement pins 32L, 32R. Then, the bent portions 9 of the steel cord 5 are transferred from the engagement pins 32L, 32R to the retaining pins 52L, 52R, respectively.

In the above-described manner, the steel cord 5 is properly placed and retained on the rubber sheet member 2 in a state in which the steel cord 5 is properly bent with the predetermined width V while keeping a specified tension. This makes it possible to stably manufacture the rubber sheet 1 containing the steel cord 5 with a constant length at proper position.

(Manufacturing Method of Rubber Sheet)

Figure 4A:
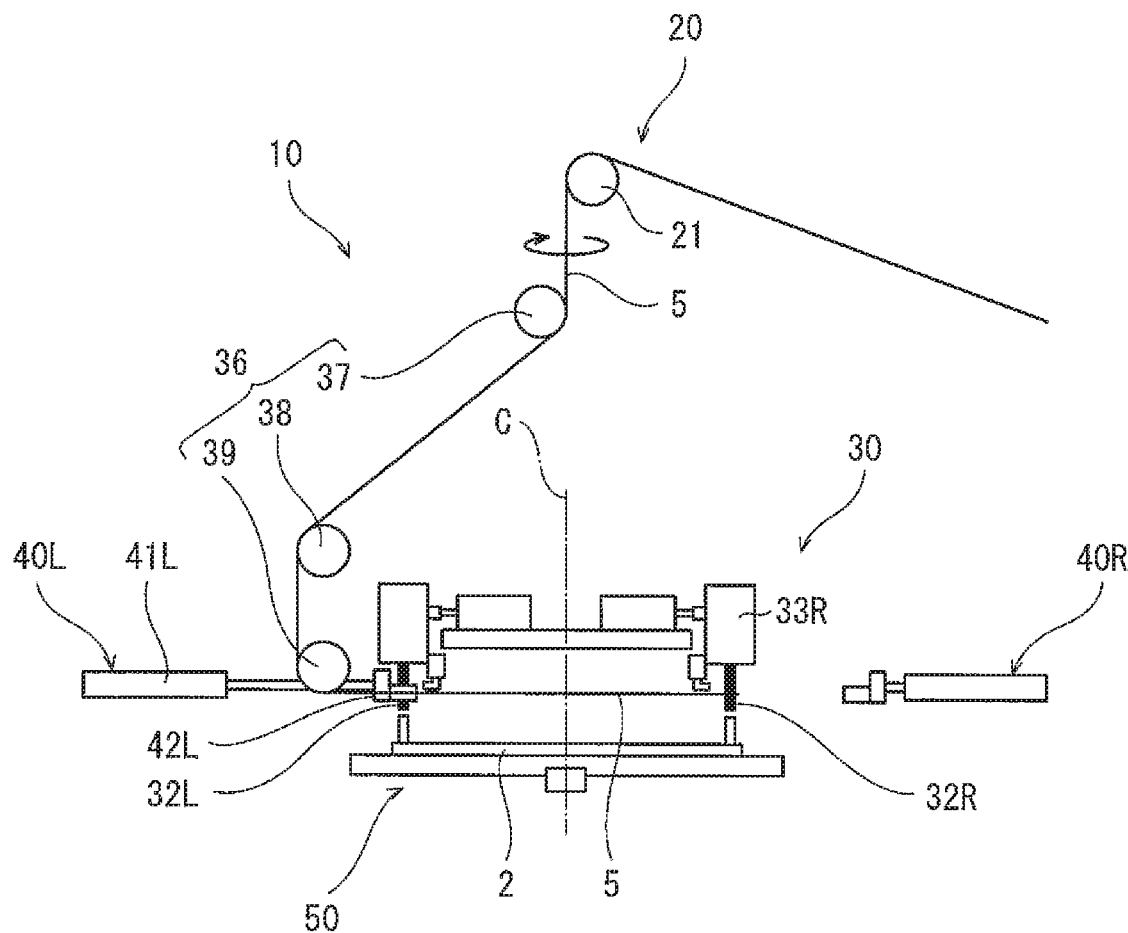
FIGS. 4A and 4B are views showing a next stage of manufacturing the rubber sheet by the manufacturing apparatus of FIGS. 3A and 3B.
Figure 4B:
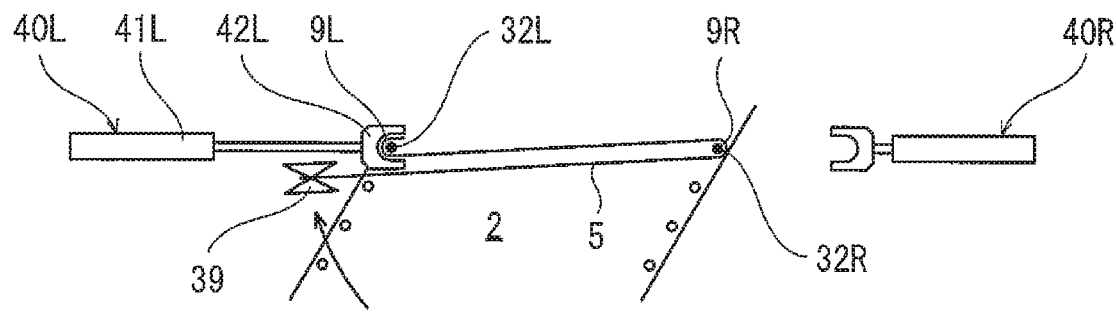

Hereinafter, the operation of the manufacturing apparatus 10 and the manufacturing method of the rubber sheet 1 will be described in detail with reference to FIGS. 4A and 4B to FIG. 20. In the drawings, major components (constituents) are designated by reference symbols and will be described. FIGS. 4A and 4B are views showing a next stage of manufacturing the rubber sheet 1, from the initial state of FIGS. 3A and 3B. FIG. 4A is a front view, and FIG. 4B is a partial plan view.

The state of FIG. 3A is a state in which the steel cord 5 being fed by the feeding device 20 is horizontally fed by the fourth roller 39 of the roller unit 36 disposed on the right side, and the end portion of the steel cord 5 is wound around the left engagement pin 32L, and held by the forming part 40L. In this state, as shown in FIG. 3B, the steel cord 5 is located to be farther than the right engagement pin 32R (downstream of the right engagement pin 32R in the feeding direction of the rubber sheet member 2).

Then, as shown in FIGS. 4A and 4B, in the state of FIGS. 3A and 3B, the roller unit 36 is rotated from the near side (upstream side in the feeding direction of the rubber sheet member 2) to the left (clockwise direction). This allows the steel cord 5 to be wound around the right engagement pin 32R by the roller unit 36 while keeping a specified tension.

Figure 5A:
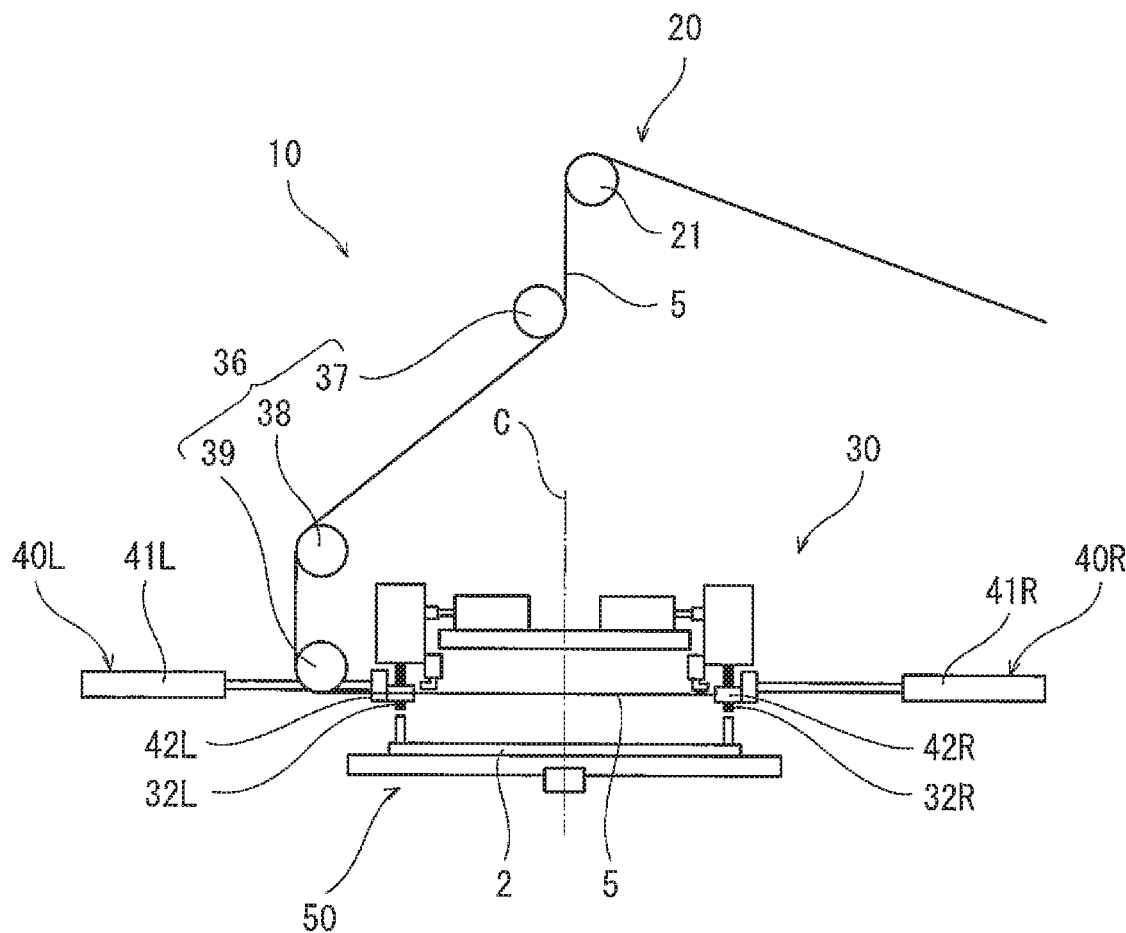
FIGS. 5A and 5B are views showing a next stage of manufacturing the rubber sheet, following the stage of FIGS. 4A and 4B.
Figure 5B:
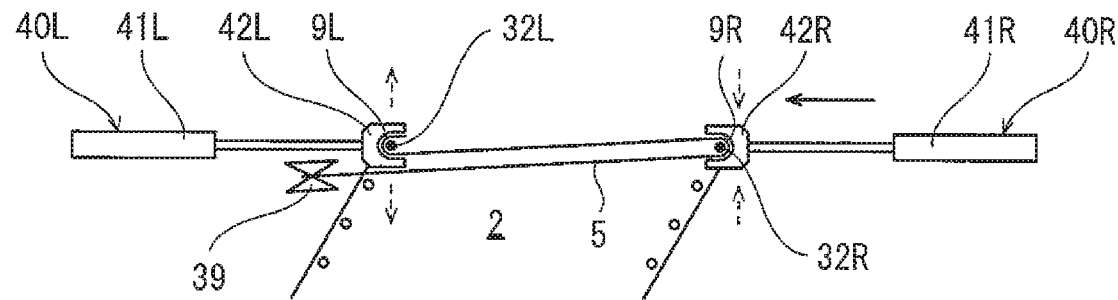

Then, as shown in FIGS. 5A and 5B, the forming cylinder 41R of the right forming part 40R is extended, and thus the right chuck 42R at the tip end is positioned at the right bent portion 9R of the steel cord 5 wound around the right engagement pin 32R. Then, the right bent portion 9R of the steel cord 5 wound around the right engagement pin 32R is pressed by the right chuck 42R of the right forming part 40R. The bending shape of the right bent portion 9R is formed in such a way that the right chuck 42R is put over the steel cord 5 wound around the right engagement pin 32R, and presses the right bent portion 9R. The left chuck 42L of the left forming part 40L having pressed the left bent portion 9L of the steel cord 5 which has been been wound around the left engagement pin 32L and has the bending shape formed previously as shown in FIGS. 3A and 3B, is released.

Figure 6A:
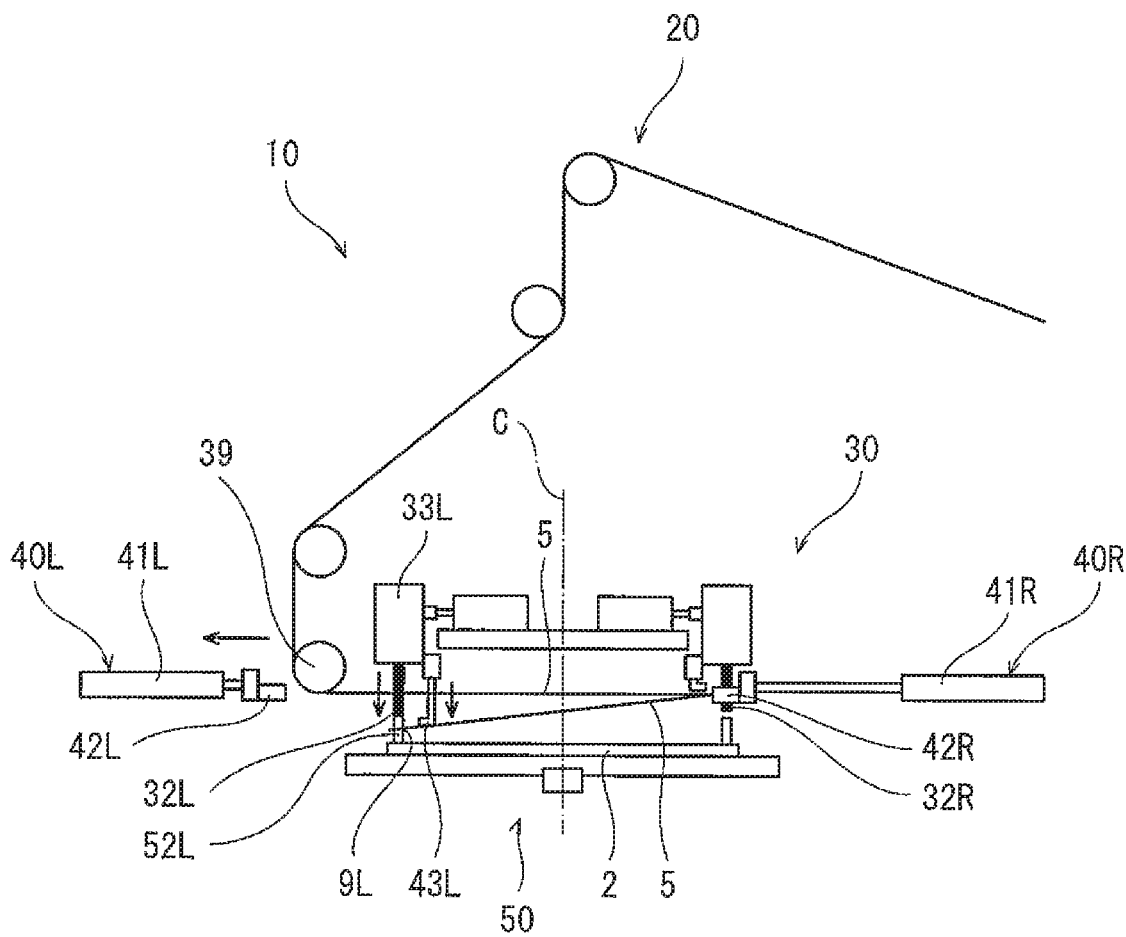
FIGS. 6A and 6B are views showing a next stage of manufacturing the rubber sheet, following the stage of FIGS. 5A and 5B.
Figure 6B:
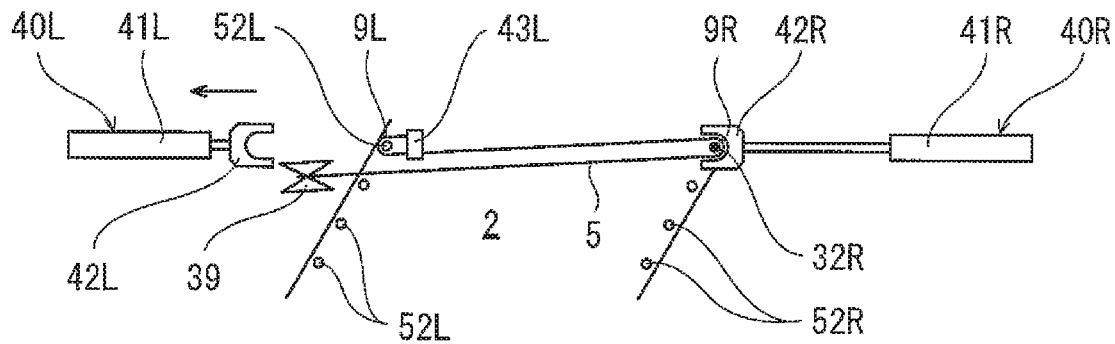

Then, as shown in FIGS. 6A and 6B, the left forming cylinder 41L of the left forming part 40L retracts the left chuck 42L from the left engagement pin 32L. Then, the left jack part 33L extends the left engagement pin 32L toward the left retaining pin 52L. Then, the left pushing part 43L is extended in a state in which the left engagement pin 32L is close to the left retaining pin 52L. Thus, the left pushing part 43L pushes down the left bent portion 9L of the steel cord 5 which has been bent previously, and the left bent portion 9L of the steel cord 5 wound around the left engagement pin 32L is transferred to the left retaining pin 52L of the placement device 50.

Figure 7A:
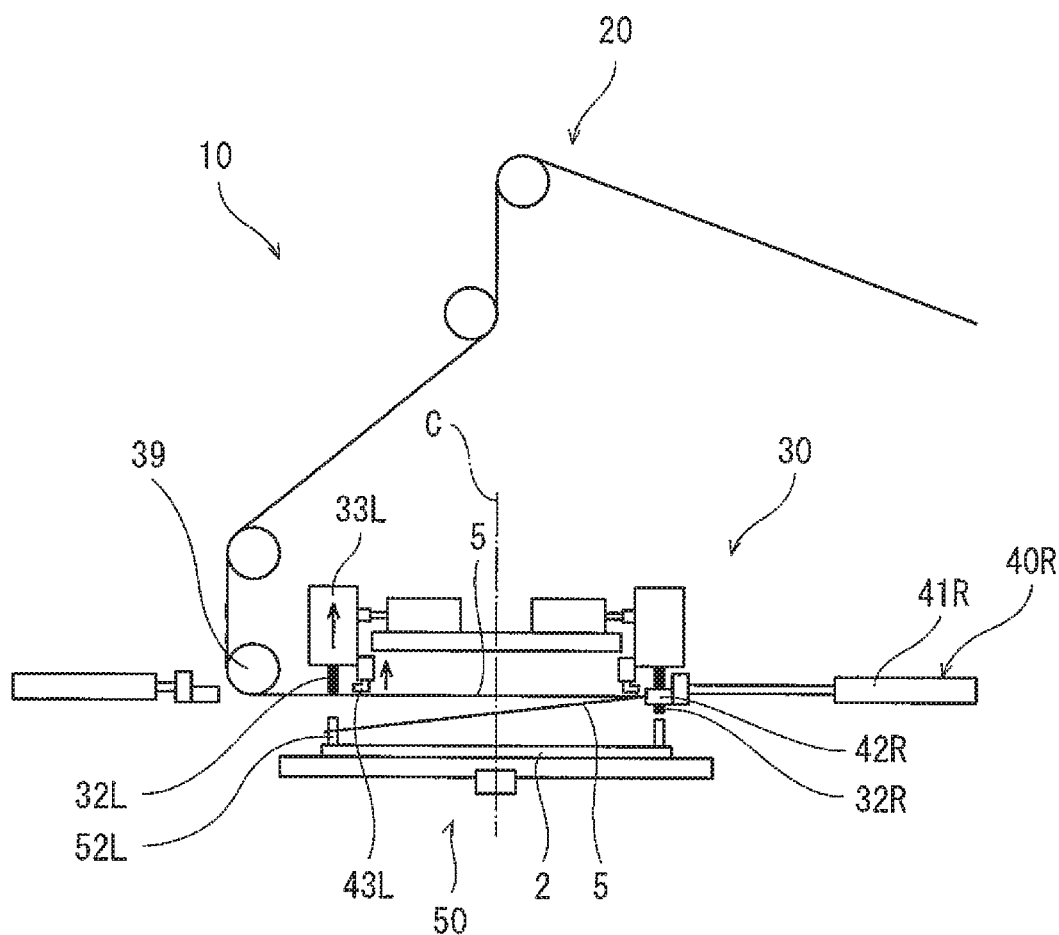
FIGS. 7A and 7B are views showing a next stage of manufacturing the rubber sheet, following the stage of FIGS. 6A and 6B.
Figure 7B:
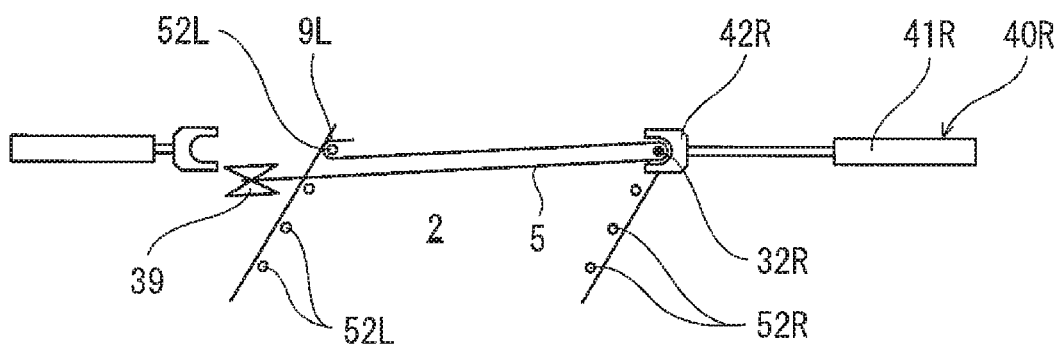

Then, as shown in FIGS. 7A and 78, the left pushing part 43L is moved upwardly and returned to its initial position. In addition, the left jack part 33L moves the left engagement pin 32L upwardly. The left engagement pin 321, is retracted upwardly to a location that is above the steel cord 5 extending horizontally from the right engagement pin 32R.

Figure 8A:
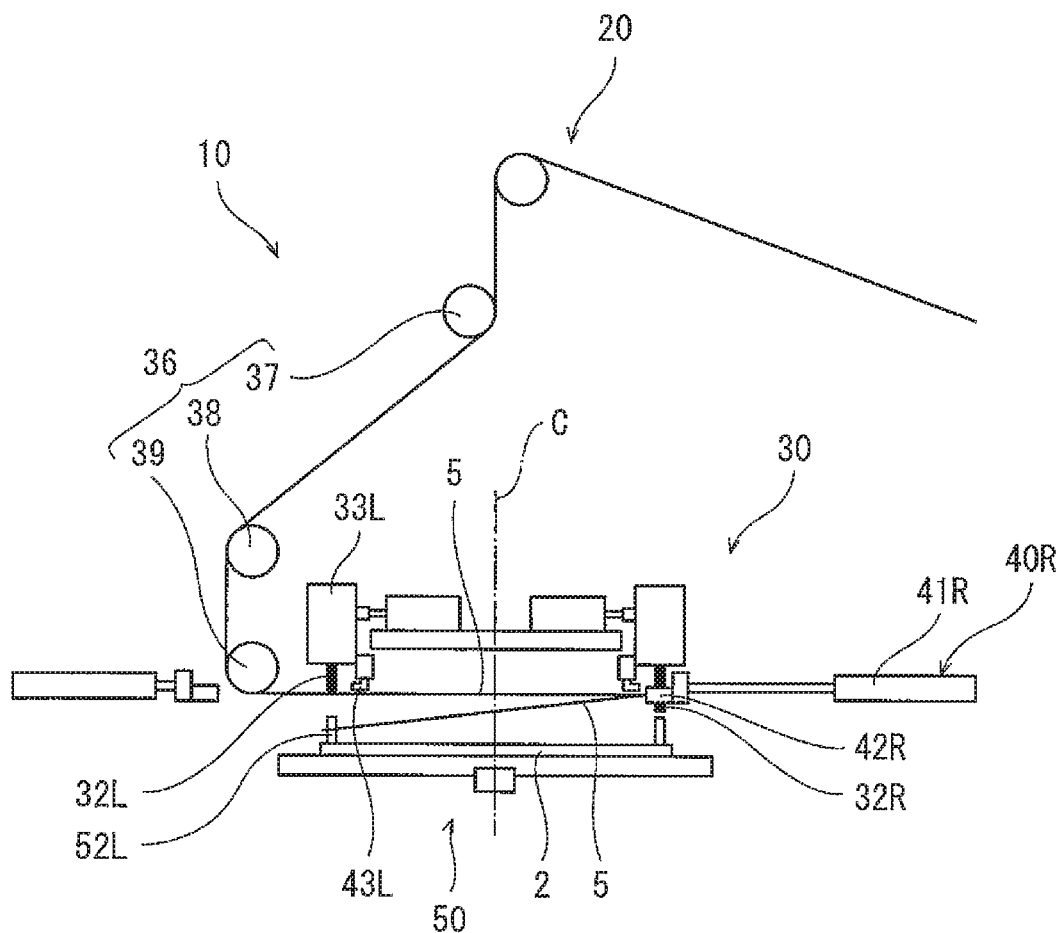
FIGS. 8A and 8B are views showing a next stage of manufacturing the rubber sheet, following the stage of FIGS. 7A and 7B.
Figure 8B:
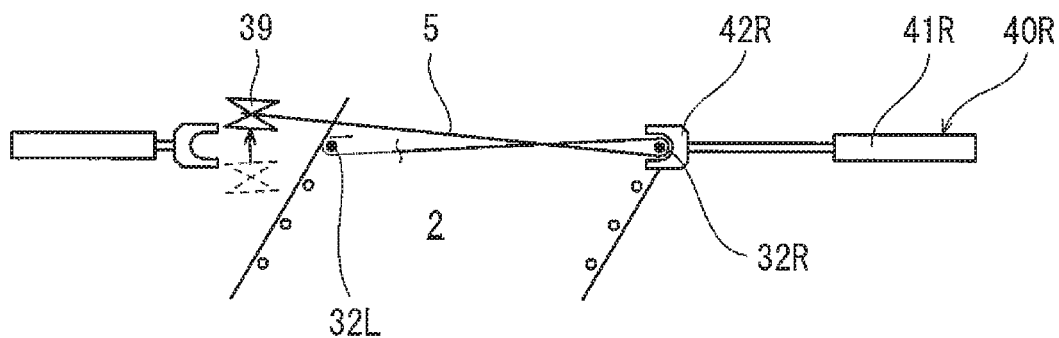

Then, as shown in FIGS. 8A and 8B, the roller unit 36 moves the steel cord 5 wrapped around the fourth roller 39 to a location that is farther than the left engagement pin 32L (downstream side of the left engagement pin 32L).

Figure 9A:
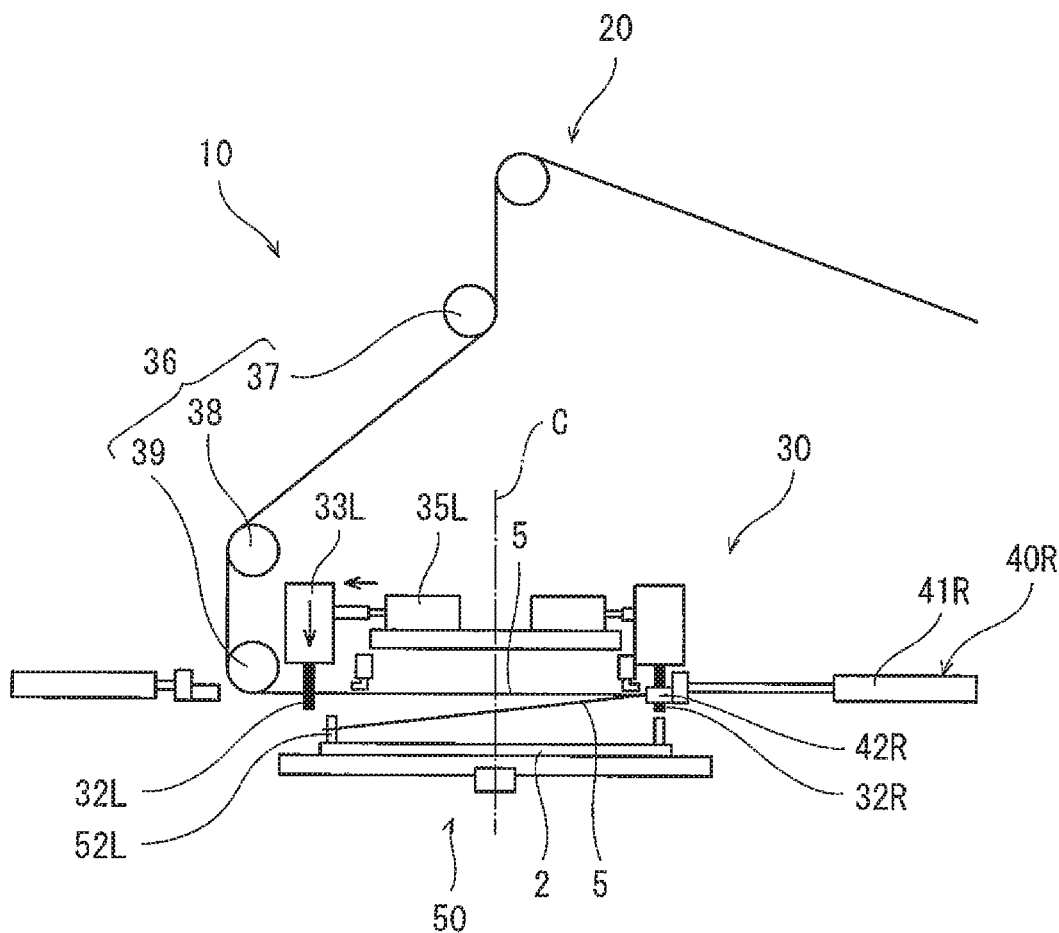
FIGS. 9A and 9B are views showing a next stage of manufacturing the rubber sheet, following the stage of FIGS. 8A and 8B.
Figure 9B:
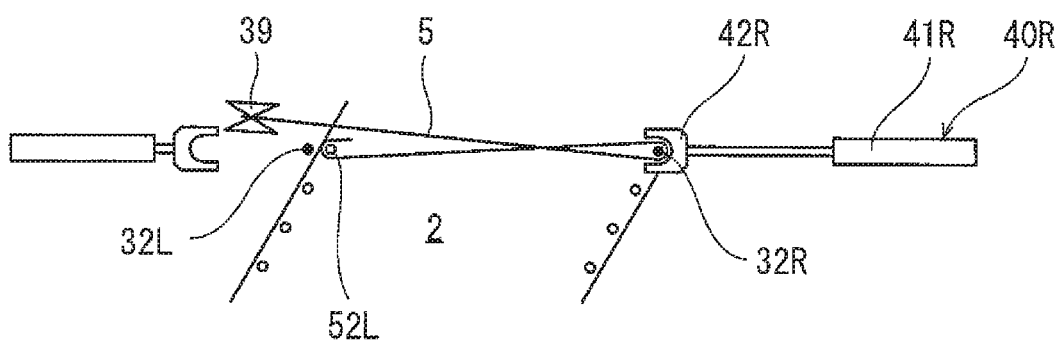

Then, as shown in FIGS. 9A and 9B, the left horizontal movement cylinder 35L horizontally moves the left jack part 33L provided with the left engagement pin 32L in a direction that is away from the right engagement pin 32R. Also, the left jack part 33L extends the left engagement pin 32L to an engagement position of the steel cord 5. The left horizontal movement cylinder 35L horizontally moves the left jack part 33L so that a distance between the right engagement pin 32R and the left engagement pin 32L which are fed to the downstream side becomes a proper distance when the placement device 50 feeds the rubber sheet member 2 to a one-pitch downstream location as shown in FIG. 18 which will be described later. This distance is set to a distance at which the steel cord 5 can keep a constant tension.

Figure 10A:
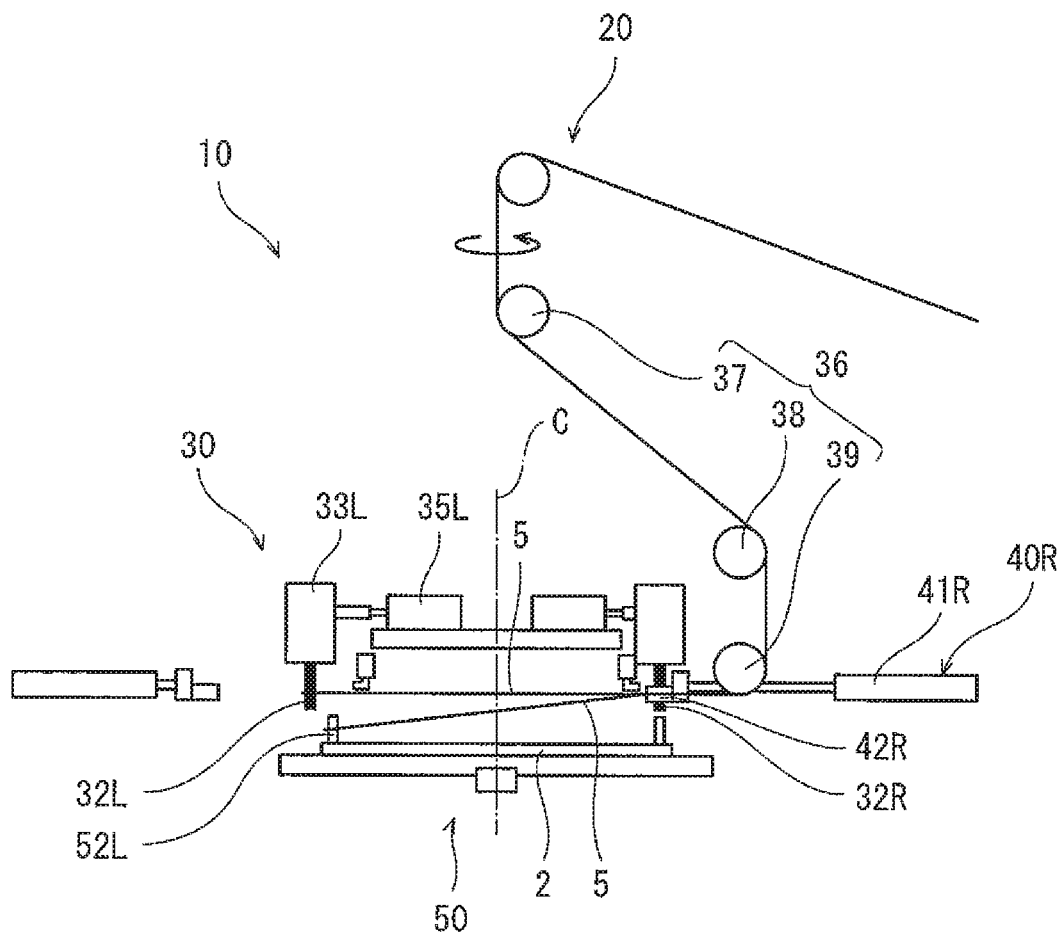
FIGS. 10A and 10B are views showing a next stage of manufacturing the rubber sheet, following the stage of FIGS. 9A and 9B.
Figure 10B:
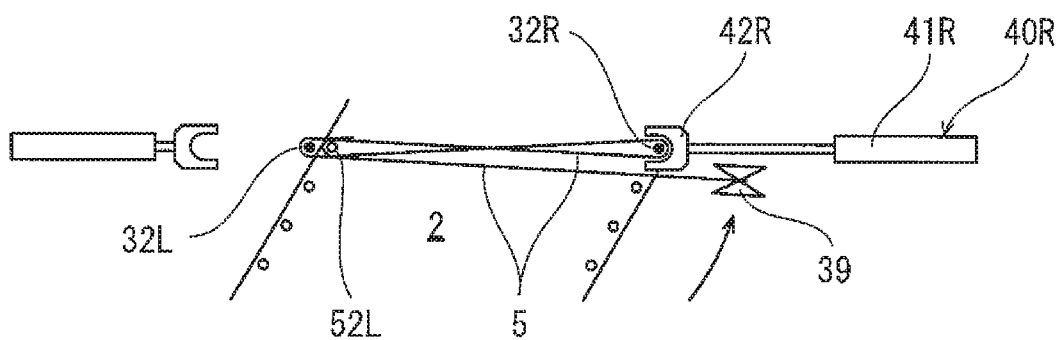

Then, as shown in FIGS. 10A and 10B, the roller unit 36 is rotated from the near side (upstream side in the feeding direction of the rubber sheet member 2) to the right (rotated in the counterclockwise direction). This allows the steel cord 5 to be wound around the left engagement pin 32L by the roller unit 36 applying a tension.

Figure 11A:
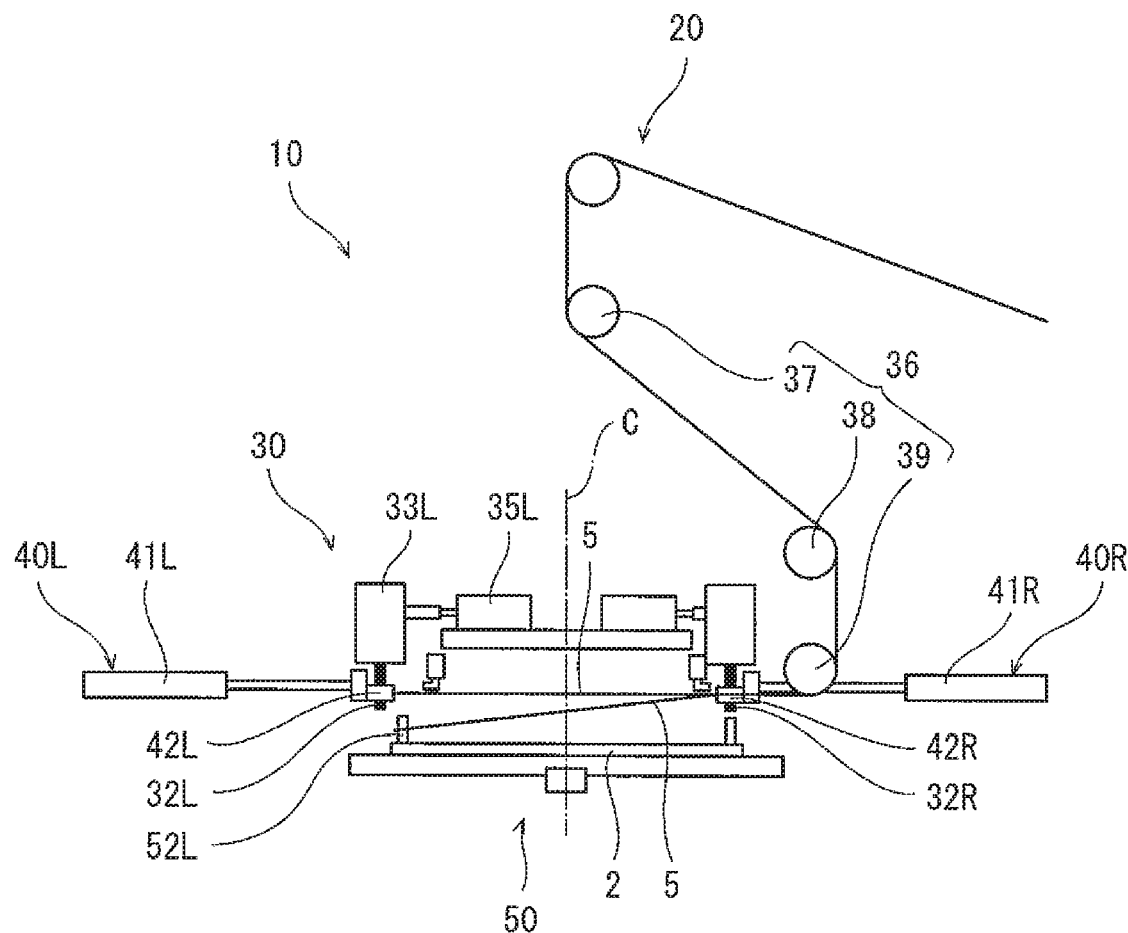
FIGS. 11A and 11B are views showing a next stage of manufacturing the rubber sheet, following the stage of FIGS. 10A and 10B.
Figure 11B:
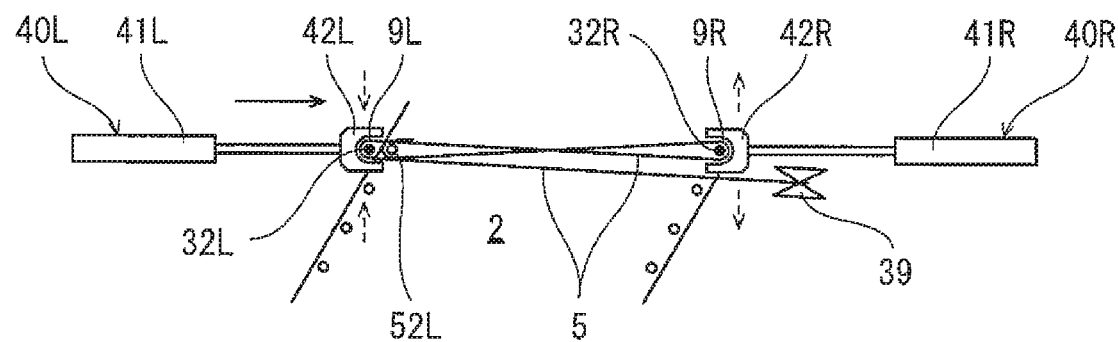

Then, as shown in FIGS. 11A and 11B, the left forming cylinder 41L of the left forming part 40L is extended, and thus the left chuck 42L is positioned at the left bent portion 9L of the steel cord 5 wound around the left engagement pin 32L. Then, the left chuck 42L presses the left bent portion 9L of the steel cord 5 wound around the left engagement pin 32L. The right chuck 42R of the right forming part 40R having pressed the right bent portion 9R of the steel cord 5 wound around the right engagement pin 32R previously as shown in FIGS. 5A and 5B, is released.

Figure 12A:
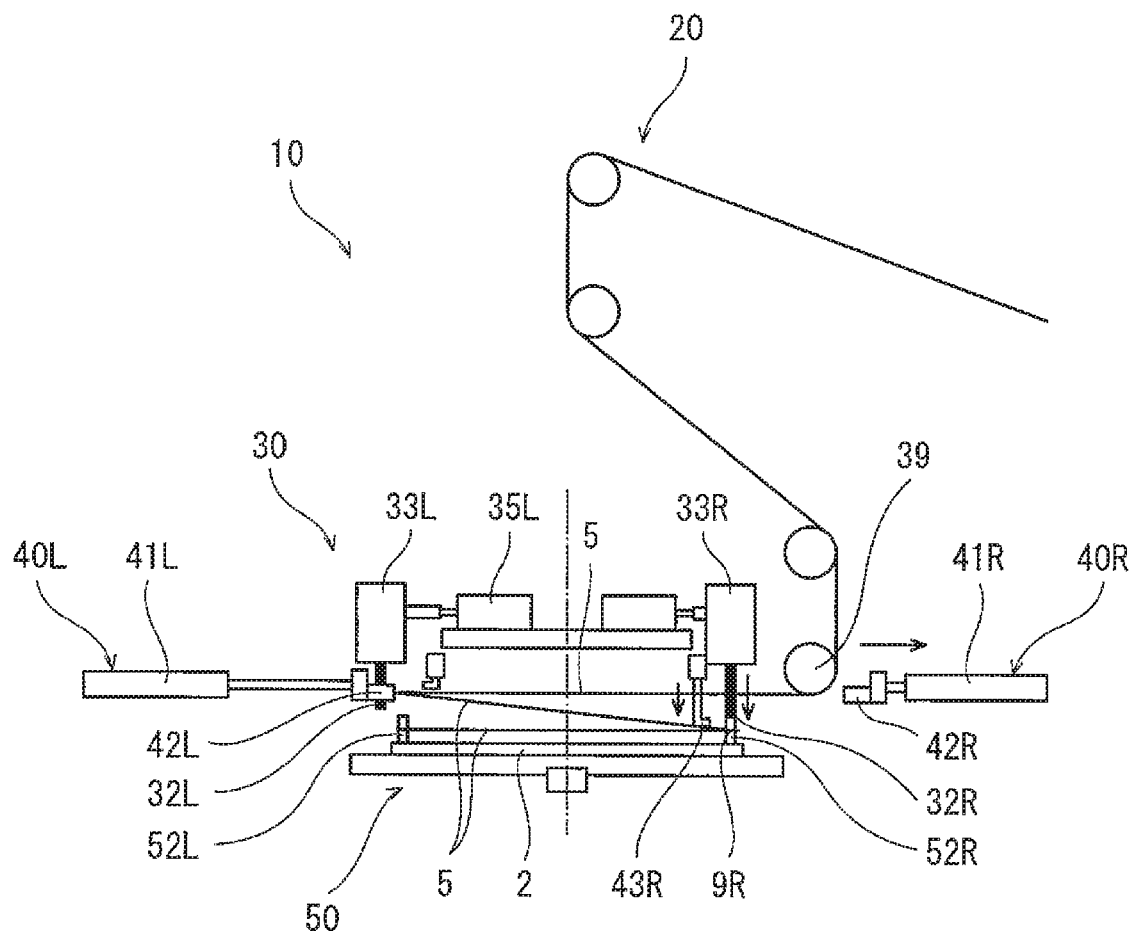
FIGS. 12A and 12B are views showing a next stage of manufacturing the rubber sheet, following the stage of FIGS. 11A and 11B.
Figure 12B:
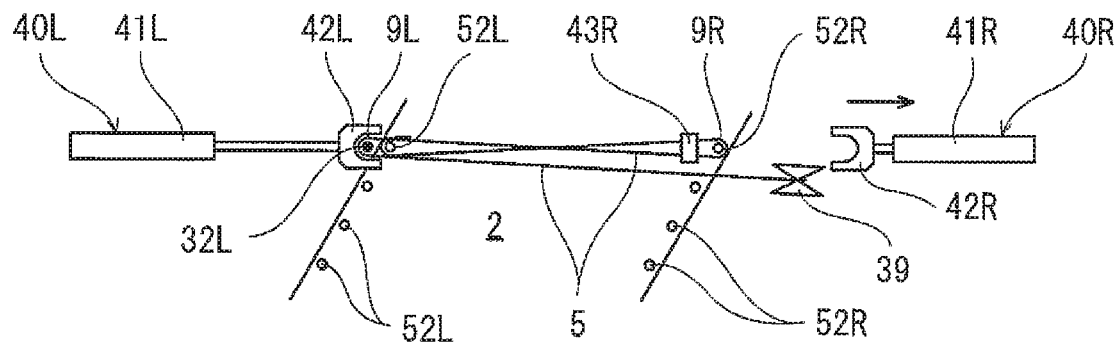

Then, as shown in FIGS. 12A and 12B, the right forming cylinder 41R of the right forming part 40R retracts the right chuck 42R from the position of the right engagement pin 32R. Then, the right jack part 33R extends the right engagement pin 32R toward the right retaining pin 52R. Then, the right pushing part 43R is extended in a state in which the right engagement pin 32R is close to the right retaining pin 52R. Thus, the right pushing part 43R pushes down the right bent portion 9R of the steel cord 5 which has been bent previously, and the right bent portion 9R of the steel cord 5 having been wound around the right engagement pin 32R, is transferred to the right retaining pin 52R.

Figure 13A:
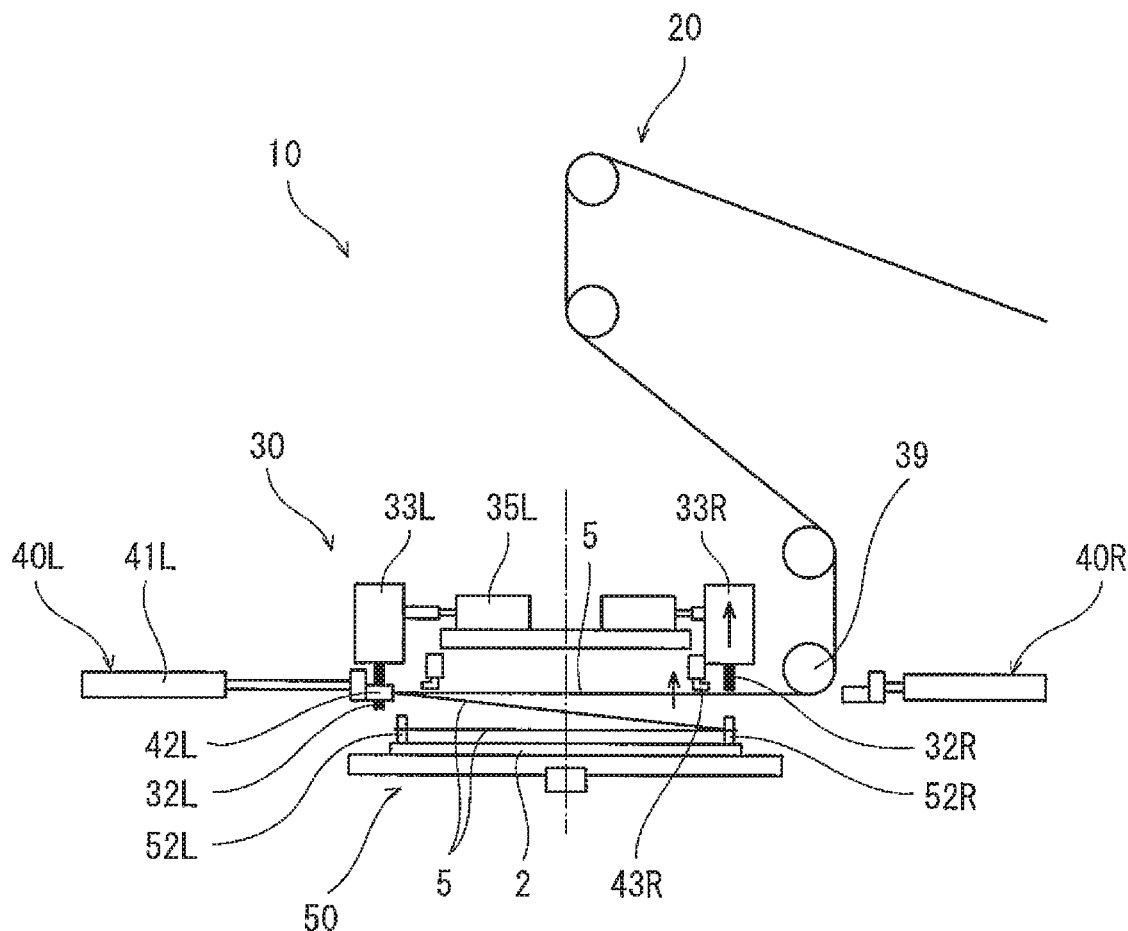
FIGS. 13A and 13B are views showing a next stage of manufacturing the rubber sheet, following the stage of FIGS. 12A and 12B.
Figure 13B:
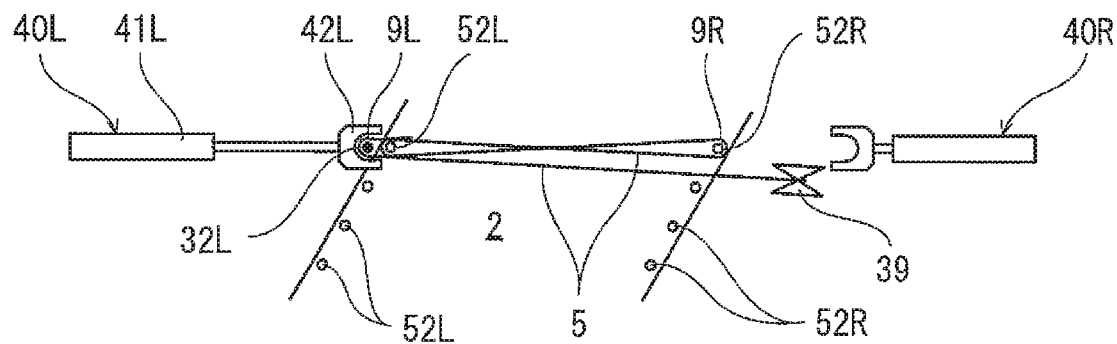

Then, as shown in FIGS. 13A and 13B, the right pushing part 43R is moved upwardly and returned to its initial position. In addition, the right jack part 33R moves the right engagement pin 32R upwardly. The right engagement pin 32R is retracted upwardly to a location that is above the steel cord 5 extending horizontally from the left engagement pin 32L.

Figure 14A:
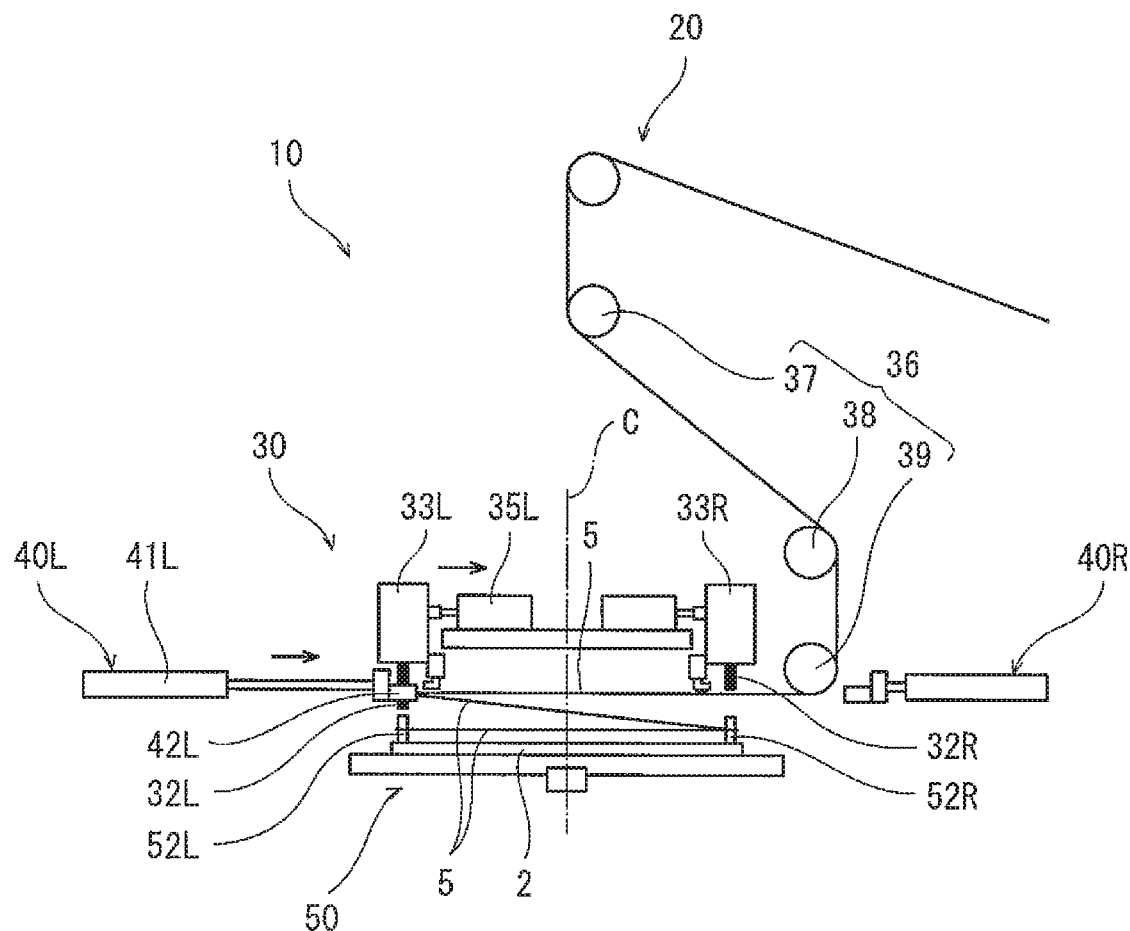
FIGS. 14A and 14B are views showing a next stage of manufacturing the rubber sheet, following the stage of FIGS. 13A and 13B.
Figure 14B:
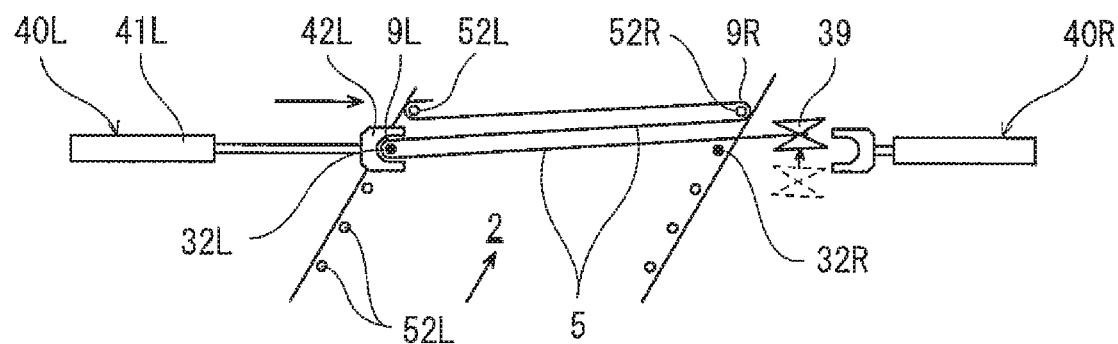

Then, as shown in FIGS. 14A and 14B, the placement device 50 feeds the rubber sheet member 2 to a farther side (downstream side) corresponding to one-pitch of the retaining pins 52L, 52R. In synchronization with this operation, the left horizontal movement cylinder 35L moves the left jack part 33L toward the right engagement pin 32R, and thus moves the left engagement pin 32L to the right. At the same time, the left forming cylinder 41L moves, to the right, the left chuck 42L which has pressed the bent portion 9L of the steel cord 5 wound around the left engagement pin 32L, to form the bending shape of the bent portion 9L. Thus, the right retaining pin 52R around which the steel cord 5 is wound is fed in an oblique direction to a one-pitch downstream location. By moving the left engagement pin 32L to the right, the predetermined width V between the right retaining pin 52R and the left engagement pin 32L can be kept. In synchronization with these operations, the roller unit 36 is rotated around the center line C, and thus the steel cord 5 is moved to a location that is farther than (downstream of) the right engagement pin 32R. By synchronizing these operations, the tension of the steel cord 5 can be kept.

Figure 15A:
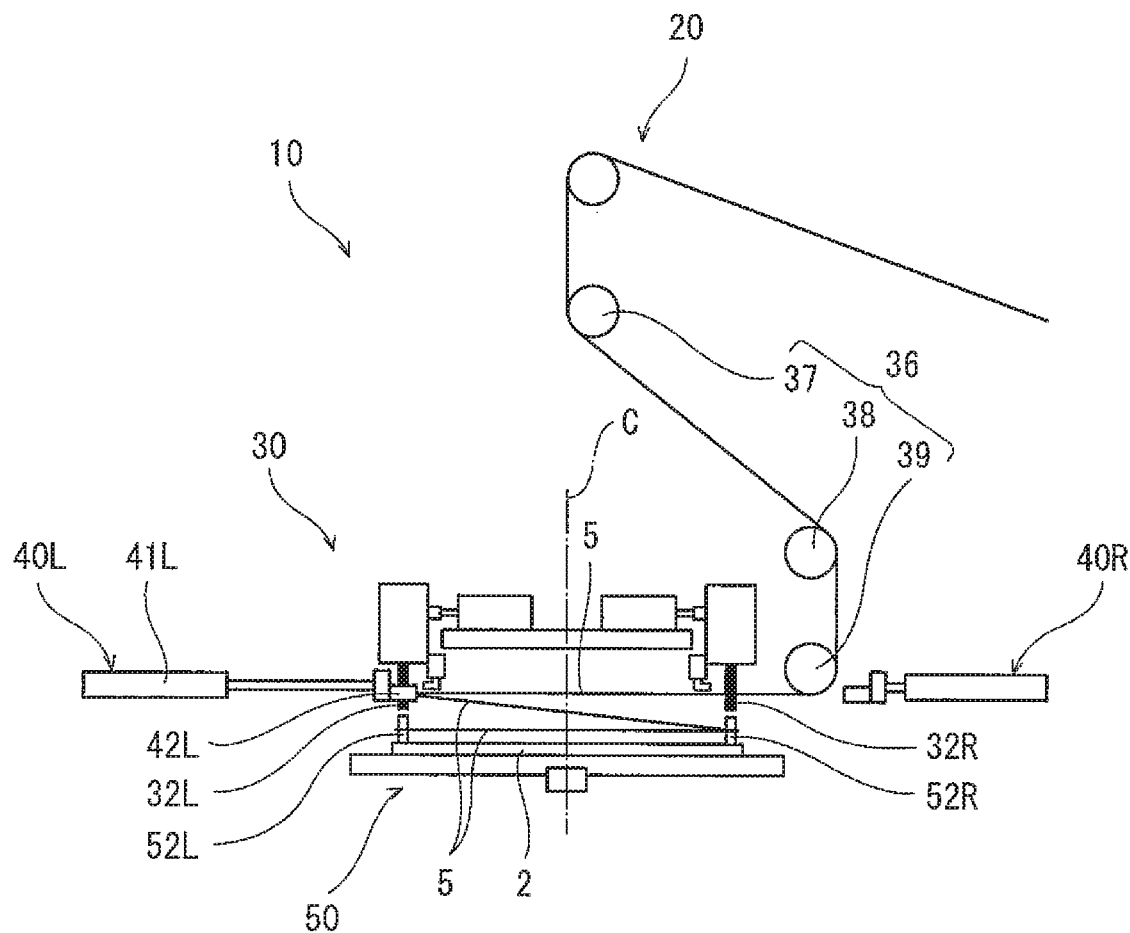
FIGS. 15A and 15B are views showing a next stage of manufacturing the rubber sheet, following the stage of FIGS. 14A and 14B.
Figure 15B:
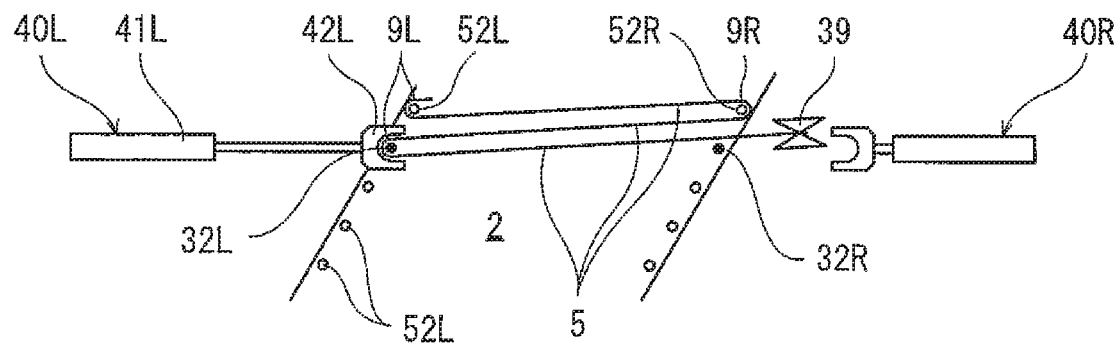

Then, as shown in FIGS. 15A and 15B, the right engagement pin 32R is extended to an engagement position where the right engagement pin 32R engages the steel cord 5. The shown state is the state shown in FIGS. 3A and 3B. By the above-described series of operations, the operation for bending the steel cord 5 corresponding to one pitch and placing the steel cord 5 on the rubber sheet member 2 is completed.

Thereafter, the operations of FIGS. 4A and 4B to FIGS. 15A and 15B are sequentially repeated. By the operations, the steel cord 5 is engaged with the engaged pins 32L, 32R with the predetermined width V, and bent, the bending shape of the bent portions 9 is formed, and then the bent portions 9 are transferred onto and retained by the retaining pins 52L, 52R in turn on the rubber sheet member 2. In this way, the steel cord 5 which has been bent with the predetermined width V and keeps a proper tension can be placed on the rubber sheet member 2 in turn, and properly retained on the rubber sheet member 2.

Figure 16:
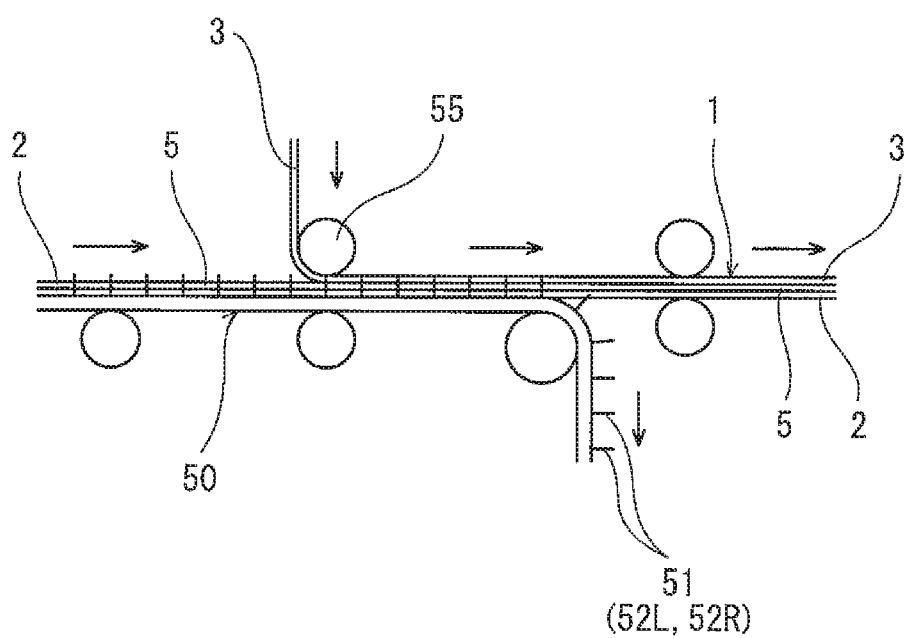
FIG. 16 is a view showing a next stage of manufacturing the rubber sheet, following the stage of FIGS. 15A and 15B.

FIG. 16 is a side view schematically showing a stage of manufacturing the rubber sheet 1 after the steel cord 5 is properly placed on the rubber sheet member 2 as described above. FIG. 16 shows the steel cords 5 contained in the rubber sheet 1 as visible and enlarged. After the steel cord 5 is placed on the lower rubber sheet member 2 as described above, the rubber sheet member 3 is fed from above so that the steel cord 5 is sandwiched between the rubber sheet member 2 and the rubber sheet member 3, and is bonded thereto. In the present embodiment, in a state in which the steel cord 5 is retained by the retaining pins 52L, 52R penetrating the lower rubber sheet member 2 being fed to the downstream side by the placement device 50, the rubber sheet member 3 bent by the roller 55 is bonded onto the steel cord 5. In this way, the rubber sheet 1 containing the steam cord 5 bent with the predetermined width V is completed.

Then, in the present embodiment, the rubber sheet 1 is separated from the placement device 50, and the retaining pins 52L, 52R are drawn (pulled) out and removed from the rubber sheet 1. In the above-described manner, the steel cord 5 placed on the lower rubber sheet member 2 is sandwiched between the lower rubber sheet member 2 and the upper rubber sheet member 3 in a state in which the steel cord 5 is retained by the retaining pins 52L, 52R. Therefore, the steel cord 5 can be contained in the rubber sheet 1 by the upper rubber sheet member 3 in a state in which the steel cord 5 is retained by the lower rubber sheet member 2.

In accordance with the above-described manufacturing apparatus 10, it becomes possible to stably manufacture the rubber sheet 1 containing the steel cord 5 different in width and length by varying the predetermined width V depending on the condition of the rubber sheet 1 containing the steel cord 5 for use with automobile tires or other uses, and by repeating the operations of FIGS. 4A and 4B to FIG. 19.

SUMMARY

As described above, in accordance with the above-described manufacturing apparatus 10 of the rubber sheet 1, the steel cord 5 can be bent with the predetermined width V and the bending shape of the bent portions 9 is formed, while keeping a specified tension of the steel cord 5, and in this state, the steel cord 5 can be properly placed on the rubber sheet member 2. Therefore, by use of the steel cord 5 placed on the rubber sheet member 2, it becomes possible to manufacture the rubber sheet 1 containing the steel cord 5 which includes the bent portions 9 which are stable in bending shape, bending shape forming position and length, and has a uniform state.

Since the steel cord 5 is properly bent and contained in the rubber sheet 1, it becomes possible to manufacture the rubber sheet 1 in which the brass-plated steel cord 5 with the predetermined width V kept is properly in contact with and is bonded to the rubber sheet members 2, 3.

Further, the steel cord 5 can be easily changed. By properly setting the positions of the engagement pins (engagement parts 31) 32L, 32R and the positions of the retaining pins (retaining parts 51) 52L, 52R, the embedding angle θ and the embedding pitch P can be changed. This makes it possible to easily manufacture a rubber sheet 1 containing a different steel cord 5 and a rubber sheet 1 different in width or thickness. As a result, it becomes possible to achieve manufacturing of the rubber sheet 1 with more kinds and less quantities.

Although in the above-described embodiment, the steel cord 5 is placed on the rubber sheet member 2 horizontally placed and fed, the rubber sheet member 2 may be fed in an inclined state or may be vertically fed. The configuration of the manufacturing apparatus 10 is not limited to the above-described embodiment.

The above-described rubber sheet 1 can be manufactured by a manufacturing method in which the steel cord 5 is fed at predetermined intervals while keeping a specified tension, is wound around and engaged with the engagement parts 31 in turn, the engagement parts 31 being disposed to be spaced from each other with the predetermined width V, the bending shape of the bent portions 9 of the steel cord 5 wound around the engagement parts 31 is formed, and then the steel cord 5 is placed and retained on the rubber sheet member 2. The configuration of the manufacturing apparatus 10 is not limited to the above-described embodiment.

The above-described embodiment is merely exemplary, and the present invention can be varied without departing from the spirit of the invention. The present invention is not limited to the above-described embodiment.

REFERENCE SIGNS LIST 1 rubber sheet
2 rubber sheet member
3 rubber sheet member
5 steel cord
6 wire
7 chucking portion
8 intermediate portion
9 bent portion
9L left bent portion
9R right bent portion
10 manufacturing apparatus
20 feeding device
30 forming device
31 engagement part
32L left engagement pin (engagement part 31)
32R right engagement pin (engagement part 31)
33L left jack part
33R right jack part
35L left horizontal movement cylinder
35R right horizontal movement cylinder
36 roller unit
40L left forming part
40R right forming part
41L left forming cylinder
41R right forming cylinder
42L left chuck
42R right chuck
43L left pushing part
43R right pushing part
50 placement device
51 retaining part
52L left retaining pin (retaining part)
52R right retaining pin (retaining part)
C center line
V predetermined width
θ embedding angle
P embedding pitch

The invention claimed is:

1. A manufacturing apparatus of a rubber sheet containing a steel cord, the manufacturing apparatus comprising:
a feeding device which feeds the steel cord while keeping a specified tension;
a forming device which winds the steel cord being fed by the feeding device around engagement parts and engages the steel cord with the engagement parts, the engagement parts being disposed to be spaced from each other with a predetermined width; and
a placement device which places the steel cord wound around the engagement parts with the predetermined width by the forming device on a rubber sheet member,
wherein the forming device includes forming parts which press bent portions of the steel cord wound around the engagement parts to form a bending shape of the bent portions, and
wherein the placement device includes a plurality of retaining parts disposed in two rows to be spaced apart from each other with the predetermined width to retain the bent portions in a state in which the steel cord having the bending shape formed by the forming device is placed on the rubber sheet member.

2. The manufacturing apparatus of the rubber sheet containing the steel cord, according to claim 1,
wherein the engagement parts include engagement pins, respectively which engage the steel cord,
wherein the retaining parts include retaining pins protruding upwardly from the rubber sheet member toward the engagement parts,
wherein the engagement pins and the retaining pins are configured to come close to each other and away from each other, and
wherein in a state in which the engagement pins and the retaining pins are close to each other, the bent portions are transferred from the engagement pins to the retaining pins and retained by the retaining pins.

3. The manufacturing apparatus of the rubber sheet containing the steel cord, according to claim 2,
wherein after the bending shape of the bent portions of the steel cord is formed, the bent portions are transferred from the engagement pins to the retaining pins in turn, and the steel cord is retained on the rubber sheet member.

4. The manufacturing apparatus of the rubber sheet containing the steel cord, according to claim 2,
wherein the retaining pins penetrate the rubber sheet member and protrude toward the engagement pins, and
wherein the placement device is configured to remove the retaining pins when the steel cord placed on the rubber sheet member is sandwiched between the rubber sheet member and another rubber sheet member to form the rubber sheet.

5. The manufacturing apparatus of the rubber sheet containing the steel cord, according to claim 1, further comprising:
a stranding device which is disposed upstream of the feeding device, and strands a plurality of wires, a plurality of strand cords, or a wire and a strand cord in opposite directions at an interval of the predetermined width, to form the steel cord,
wherein the feeding device includes a feeding unit which feeds the steel cord to the forming device so that unstranded portions between portions having been stranded in the opposite directions by the stranding device are wound around the engagement parts.

6. A manufacturing method of a rubber sheet containing a steel cord, the manufacturing method comprising:
feeding the steel cord at a predetermined interval while keeping a specified tension;
winding the steel cord around engagement parts and engaging the steel cord with the engagement parts, in turn, the engagement parts being disposed to be spaced apart from each other with a predetermined width;
forming a bending shape of bent portions of the steel cord wound around the engagement parts; and
placing the steel cord including the bent portions having the bending shape formed at the engagement parts, on a rubber sheet member, and retaining the steel cord on the rubber sheet member by using a plurality of retaining parts disposed in two rows to be spaced apart from each other with the predetermined width to retain the bent portions in a state in which the steel cord having the bending shape is placed on the rubber sheet member.

* * * * *